US008860959B2

(12) United States Patent
Sakura

(10) Patent No.: US 8,860,959 B2
(45) Date of Patent: Oct. 14, 2014

(54) CONFIGURING SETTINGS FOR EXCEPTION PAGES IN A PRINT JOB

(75) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1911 days.

(21) Appl. No.: 11/765,625

(22) Filed: Jun. 20, 2007

(65) Prior Publication Data

US 2007/0296995 A1 Dec. 27, 2007

(30) Foreign Application Priority Data

Jun. 23, 2006 (JP) ................. 2006-173630

(51) Int. Cl.
G06F 3/12 (2006.01)
(52) U.S. Cl.
CPC ............ *G06F 3/1205* (2013.01); *G06F 3/1208* (2013.01); *G06F 3/1206* (2013.01); *G06F 3/1204* (2013.01); *G06F 3/1253* (2013.01); *G06F 3/1257* (2013.01); *G06F 2206/1514* (2013.01)
USPC ....................................... 358/1.13
(58) Field of Classification Search
CPC ... G06F 3/1204; G06F 3/1205; G06F 3/1206; G06F 3/1208; G06F 3/1253
USPC .............................. 358/1.13, 1.15
See application file for complete search history.

(56) References Cited

U.S. PATENT DOCUMENTS

| 2001/0026288 | A1* | 10/2001 | Shima .......................... 345/764 |
| 2004/0060010 | A1* | 3/2004 | Bright et al. .................. 715/526 |
| 2005/0152000 | A1* | 7/2005 | Van de Capelle et al. ... 358/1.18 |

FOREIGN PATENT DOCUMENTS

| JP | 2003-029942 A | 1/2003 |
| JP | 2003-162407 A | 6/2003 |
| JP | 2004-110638 A | 4/2004 |
| JP | 2004-126871 A | 4/2004 |
| JP | 2005-157841 A | 6/2005 |
| JP | 2005-250606 A | 9/2005 |
| JP | 2006-110861 A | 4/2006 |

* cited by examiner

*Primary Examiner* — Fred Guillermety
(74) *Attorney, Agent, or Firm* — Canon USA, Inc., IP Division

(57) ABSTRACT

An apparatus stores a setting value for each print setting item as a basic print setting for a print job according to an instruction of operation from an operator entered via a print setting screen, and sets a setting value for one specific print setting item as exception setting, according to an instruction of operation from the operator entered via an exception page setting screen for designating a setting value for the exception setting different from the setting value for the basic print setting of the print job, with respect to the print setting item, which is entered according to the operation instruction to the one specific print setting item of plural print setting items displayed on the print setting screen. The apparatus defines switching of the print setting for the print job, according to the basic print setting and the exception setting.

16 Claims, 29 Drawing Sheets

%ConstraintsFileVersion: 1.0 —— 1202

%Constraints *PrintStyle *Booklet *BindingEdge *LongEdge —— 1203
%Constraints *PrintStyle *Booklet *BindingEdge *ShortEdge —— 1204

FIG. 17

| FUNCTION | 1 | ~9 | 10 | 11~19 | 20 | 21~ | 30 |
|---|---|---|---|---|---|---|---|
| PRINT STYLE | (NULL) | (NULL) | (NULL) | (NULL) | (NULL) | TWO-SIDED | TWO-SIDED |
| COLOR MODE | (NULL) | (NULL) | COLOR | COLOR | (NULL) | (NULL) | (NULL) |
| PAPER SIZE | (NULL) | (NULL) | (NULL) | (NULL) | (NULL) | A3 | A3 |
| HALFTONE | (NULL) | (NULL) | (NULL) | (NULL) | (NULL) | (NULL) | (NULL) |
| RGB INPUT PROFILE | (NULL) | | | | | | (NULL) |

FIG. 20

| FUNCTION | PAGE-BY-PAGE SETTING VALUE | | | | | | |
|---|---|---|---|---|---|---|---|
| | 1 | ~9 | 10 | 11~19 | 20 | 21~ | 30 |
| PRINT STYLE | (NULL) | (NULL) | (NULL) | (NULL) | (NULL) | TWO-SIDED | TWO-SIDED |
| COLOR MODE | (NULL) | (NULL) | COLOR | COLOR | COLOR | (NULL) | (NULL) |
| PAPER SIZE | (NULL) | (NULL) | (NULL) | (NULL) | (NULL) | A3 | A3 |
| HALFTONE | (NULL) | (NULL) | (NULL) | (NULL) | (NULL) | (NULL) | (NULL) |
| RGB INPUT PROFILE | (NULL) | (NULL) | sRGB | sRGB | sRGB | (NULL) | (NULL) |

FIG. 23

| FUNCTION | PAGE-BY-PAGE SETTING VALUE | | | | | | |
|---|---|---|---|---|---|---|---|
| | 1~4 | 5~9 | 10 | 11~19 | 20 | 21~ | 30 |
| PRINT STYLE | (NULL) | (NULL) | (NULL) | (NULL) | (NULL) | TWO-SIDED | TWO-SIDED |
| COLOR MODE | (NULL) | (NULL) | COLOR | COLOR | COLOR | (NULL) | (NULL) |
| PAPER SIZE | (NULL) | (NULL) | (NULL) | (NULL) | (NULL) | A3 | A3 |
| HALFTONE | (NULL) | (NULL) | (NULL) | (NULL) | (NULL) | (NULL) | (NULL) |
| RGB INPUT PROFILE | (NULL) | sRGB | sRGB | sRGB | sRGB | (NULL) | (NULL) |

| FIELD NAME | VALUE |
|---|---|
| COMPULSORY SETTING FLAG | True or False |

2701

CONFIGURING SETTINGS FOR EXCEPTION PAGES IN A PRINT JOB

BACKGROUND OF THE INVENTION

1. Field of the Invention

The present invention relates to an information processing apparatus, a print setting method, and a computer-readable program. In particular, the present invention relates to an information processing apparatus, a print setting method capable of performing a setting for changing a print attribute of a print job on a specific page or page range and a computer-readable program therefor.

2. Description of the Related Art

In a print-on-demand (POD) market and in the field of a high-end printer driver and a hot folder for use in office, a function for enabling a different setting of a print attribute for each page is desired in addition to setting of a print attribute for the whole print job. For example, in creating a document including a plurality of chapters, there is a case where a color paper is used for a first page of a chapter and a white paper is used for other pages of the chapter.

In this case, a print attribute setting different from the print attribute setting for the whole job is performed, in which a white paper is used for the whole job and a color paper is used for the first page of a chapter. While the setting in the examples is made as to paper type and color, other print attributes, for example, paper size, one side or both sides printing, finishing, and color is desired to be set for a specific page of page range.

Generally, in performing a different print setting to each page using a printer driver, an operator of an apparatus opens a property sheet for setting an exception page, then designates a page range to generate a partition, and sets a print attribute in a dialog box in a layer below the generated partition.

Japanese Patent Application Laid-Open No. 2004-110638 discusses a method in which a printer driver includes a setting function unit capable of performing a different setting for print attribute for each section by storing a current setting value set in properties of the printer driver as a section setting information file.

Japanese Patent Application Laid-Open No. 2005-250606 discusses a method in which an exception print condition is predetermined other than a basic setting condition using a printer driver. For example, a paper size "A3" and a 1-up layout are set as an exception setting condition, and "A4" and "2-up" are set as basic setting conditions to perform printing.

Under these conditions, in the case where a document to be input includes five pages of "A4", "A4", "A3", "A4", and "A4" size, the A4-sized first and second pages of the input document are printed in "2-up". The A3-sized third page of the document corresponds to the exception setting condition and is printed in "1-up" printing, and the fourth and fifth pages are printed in "2-up" printing.

According to the Japanese Patent Application Laid-Open No. 2004-110638, a user interface (UI) for basic setting is used in performing an exception setting so that a current setting set in a property can be selected to be "applied to current section" or "applied to current section and beyond". Attributes that are set here as exception are all setting values in a property of a printer driver.

That is, in a setting sequence like this, when values for some setting items are changed for a specific page, the values to be changed are registered as values for the entire setting items. That is, the setting items desired to be set in common for the entire document are managed in each section set as an exception. Accordingly, it is necessary to change the values to default as to each section when the setting values set in common to the entire document are changed after exceptions are set, which makes the operation much complicated.

The Japanese Patent Application Laid-Open No. 2005-250606 discusses a method in which a condition for changing a print attribute and a print attribute to be changed are set. In this method, print attributes cannot be changed between pages in which print attributes are not changed. That is, it is necessary that a user recognizes in advance a page number of a document whose paper size as a changing condition, is changed. Further, if the paper size is not changed at a portion where the print attribute is desired to be changed, the method is not feasible.

There is another method in which an exception page sheet is provided in a property screen of a printer driver in addition to and separately from a main print setting sheet, and a range of pages to be set as an exception and an exception print setting are set in the exception page sheet.

However, in such a method, an exception setting can be performed only with respect to the print setting items included in the exception page sheet, which does not offer a high degree of flexibility. Furthermore, it is necessary to open an exception setting sheet other than a main print setting sheet. Therefore, an operator cannot easily recognize what exception setting is to be performed to a main print setting because the exception setting is performed using a separate exception setting sheet.

SUMMARY OF THE INVENTION

An embodiment of the present invention is directed to a method for allowing a user to perform an exception page setting on each print setting item in a print setting screen for performing a print setting common to the entire print job.

According to an aspect of the present invention, an embodiment is directed to an apparatus configured to set a print setting of a print job to be printed. The apparatus includes: a first display unit configured to display a print setting screen for designating a setting value for each of print setting items on a display device; a storage unit configured to store the setting value for each of the plurality of setting items as a basic print setting for the print job according to an instruction of operation entered via the print setting screen; a second display unit configured to display an exception page setting screen for designating a setting value for exception setting different from a setting value for the basic print setting for the print job, with respect to at least one print setting item, on the display device, according to an instruction of operation to the at least one print setting item of the plural print setting items displayed on the print setting screen; a setting unit configured to set the setting value for the at least one print setting item as the exception setting according to an instruction of operation entered via the exception page setting screen; and a definition unit configured to define switching of the print setting for the print job according to the basic print setting and the exception setting.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 12 illustrates an example of a constraint rule file according to the first exemplary embodiment of the present invention.

FIG. 17 illustrates an exception page setting table according to the first exemplary embodiment of the present invention.

FIG. 20 illustrates an exception page setting table according to the first exemplary embodiment of the present invention.

FIG. 23 illustrates an exception page setting table according to the first exemplary embodiment of the present invention.

FIG. 27 illustrates a compulsory setting flag table according to the second exemplary embodiment of the present invention.

DETAILED DESCRIPTION OF THE EXEMPLARY EMBODIMENTS

Various exemplary embodiments, features and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

First Exemplary Embodiment

Now, a first exemplary embodiment of the present invention will be described below with reference to FIGS. 1 through 25.

<Exemplary Hardware Configuration of Information Processing System>

Figure 1:
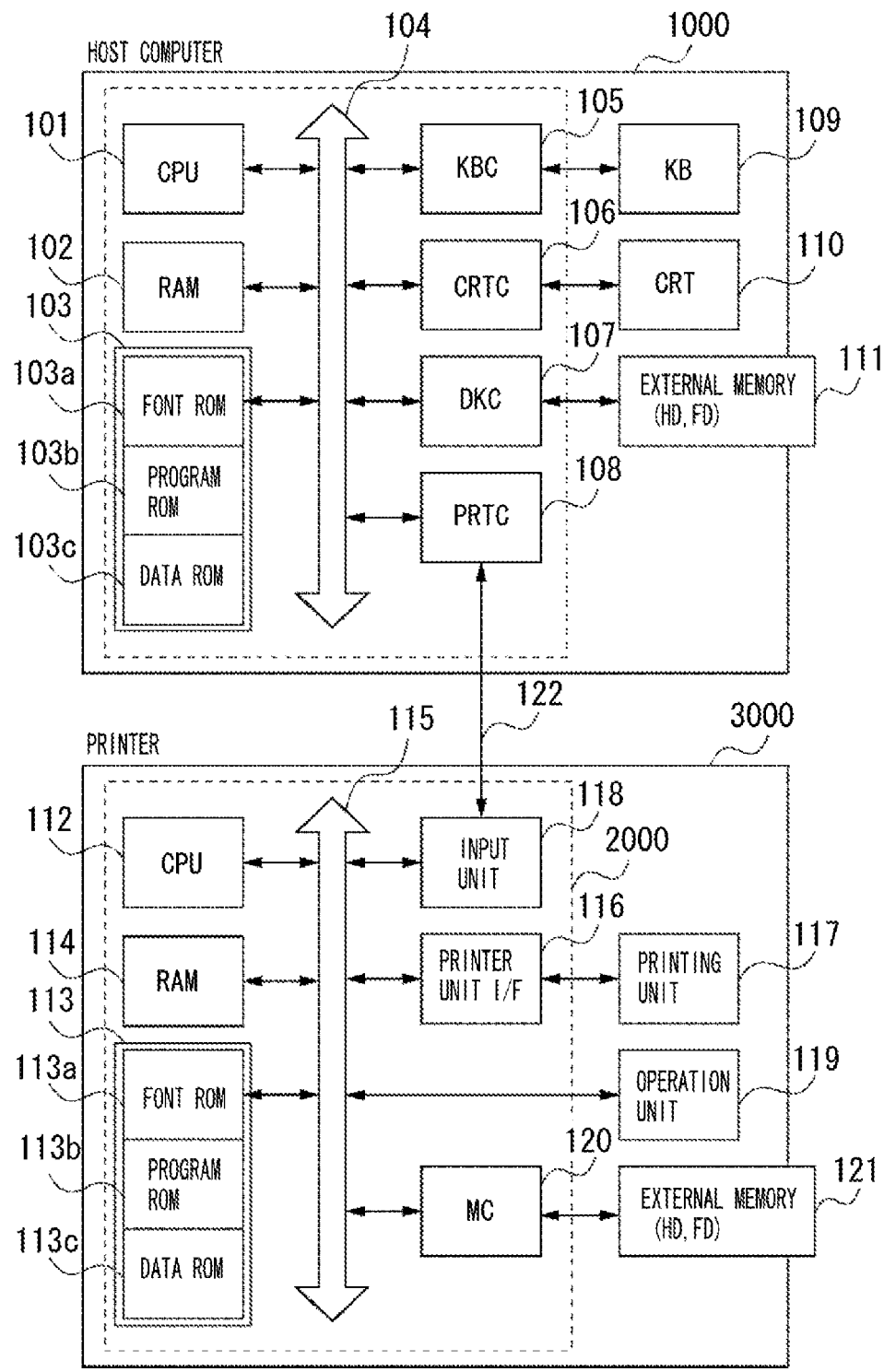
FIG. 1 illustrates a hardware configuration of an information processing system according to a first exemplary embodiment of the present invention.

FIG. 1 illustrates a hardware configuration of an information processing system according to the first exemplary embodiment of the present invention.

A host computer 1000, which is an information processing apparatus, includes a central processing unit (CPU) 101. The CPU 101 performs processing based on a program such as a document processing program (application program) and a print processing-related program stored in a program read only memory (ROM) 103*b* of a ROM 103 or an external memory 111.

The processing performed by the CPU 101 includes processing of a document in which components such as a graphic, an image, a text, and a table (including a spreadsheet) are mixed. Further, the CPU 101 controls each device connected to a system bus 104 in the host computer 1000.

The program ROM 103*b* of the ROM 103 or the external memory 111 stores a basic input output system (BIOS) and a program such as an operating system (OS) program (i.e., a control program for the CPU 101).

In addition, a font ROM 103*a* of the ROM 103 or the external memory 111 stores data such as font data used in processing a document. Furthermore, a data ROM 103*c* of the ROM 103 or the external memory 111 stores various data used in performing various processing such as document processing.

A random access memory (RAM) 102 functions as a main memory and a work area for the CPU 101. A keyboard controller (KBC) 105 controls key input through a keyboard (KB) 109 and input of a command from a pointing device (not shown).

A cathode ray tube controller (CRTC) 106 controls a display on a CRT display (CRT) 110. A liquid crystal display (LCD) controller and an LCD or a surface-conduction electron-emitter display (SED) controller and an SED can also be used instead of the CRT controller 106 and the CRT display 110.

A disk controller (DKC) 107 controls access to the external memory 111 such as a hard disk (HD) and a floppy disk (FD). The external memory 111 stores a boot program and various kinds of application programs and various data such as font data, a user file, an editing file, and a print control command generation program (hereinafter referred to as a "printer driver").

A printer controller (PRTC) 108 communicates with a printer 3000 via a specific interactive interface (I/F) 122 to control communication with the printer 3000. For the interactive interface, a universal serial bus (USB) interface, an Institute of Electrical and Electronics Engineers (IEEE) 1394 interface, and a wireless local area network (LAN) interface, for example, can be used.

The CPU 101 performs rasterizing of an outline font onto display information RAM set on the RAM 102 to provide a graphical user interface (GUI). Thus, "what you see is what you get" (WYSIWYG) on the CRT display 110 is available. In addition, the CPU 101, based on a command generated through the operation of a mouse cursor (not shown) on the CRT display 110, opens various registered windows and performs various kinds of data processing.

A user, when performing printing, opens an window (operation screen) related to print setting to perform settings for a printer and settings for a printing method on the printer driver including selection of a print mode.

The printer (printing apparatus) 3000 includes a printer CPU 112. The printer CPU 112 controls each device connected to a system bus 115 in a printer control unit 2000. In addition, the printer CPU 112 outputs an image signal as output information to a printing unit (printer engine) 117 via a printing unit interface (I/F) 116.

The output is performed based on the program such as a control program stored in the program ROM 113*b* of the ROM 113 or an external memory 121.

The program ROM 113*b* of the ROM 113 stores a control program for the printer CPU 112. In addition, the font ROM 113*a* of the ROM 113 stores data such as font data used in generating the output information.

In the case of a printer that does not include the external memory 121 such as a hard disk (HD) or an integrated circuit (IC) card, the data ROM 113*c* of the ROM 113 stores information used on the host computer 1000.

The printer CPU 112 can perform processing for communicating with the host computer 1000 via an input unit 118. Furthermore, the printer CPU 112 is capable of notifying various information such as status information in the printer 3000 to the host computer 1000.

A RAM 114 functions as a main memory and a work area for the printer CPU 112. The capacity of the RAM 114 can be expanded using an optional RAM connected to an expansion port (not shown).

The RAM 114 is used as an output information expansion area, an environmental data storage area, and a non-volatile random access memory (NVRAM). An access to the external memory 121 is controlled by a memory controller (MC) 120.

The external memory 121 is connected as an option and stores data such as font data, an emulation program, and form data. An operation unit 119 includes an operation panel, a switch, and a light-emitting diode (LED) display device used for performing various operations on the printer 3000.

The number of the external memory 121 is not limited to one. That is, according to the present exemplary embodiment, more than one external memories 121 can be provided such that in addition to a built-in font, a plurality of external memories storing an option font card, and a program for interpreting printer control languages of different language systems can be connected. Further, an NVRAM (not shown) can be provided so that printing mode setting information from the operation unit 119 can be stored.

<Operation of Printer Driver>

Figure 2:
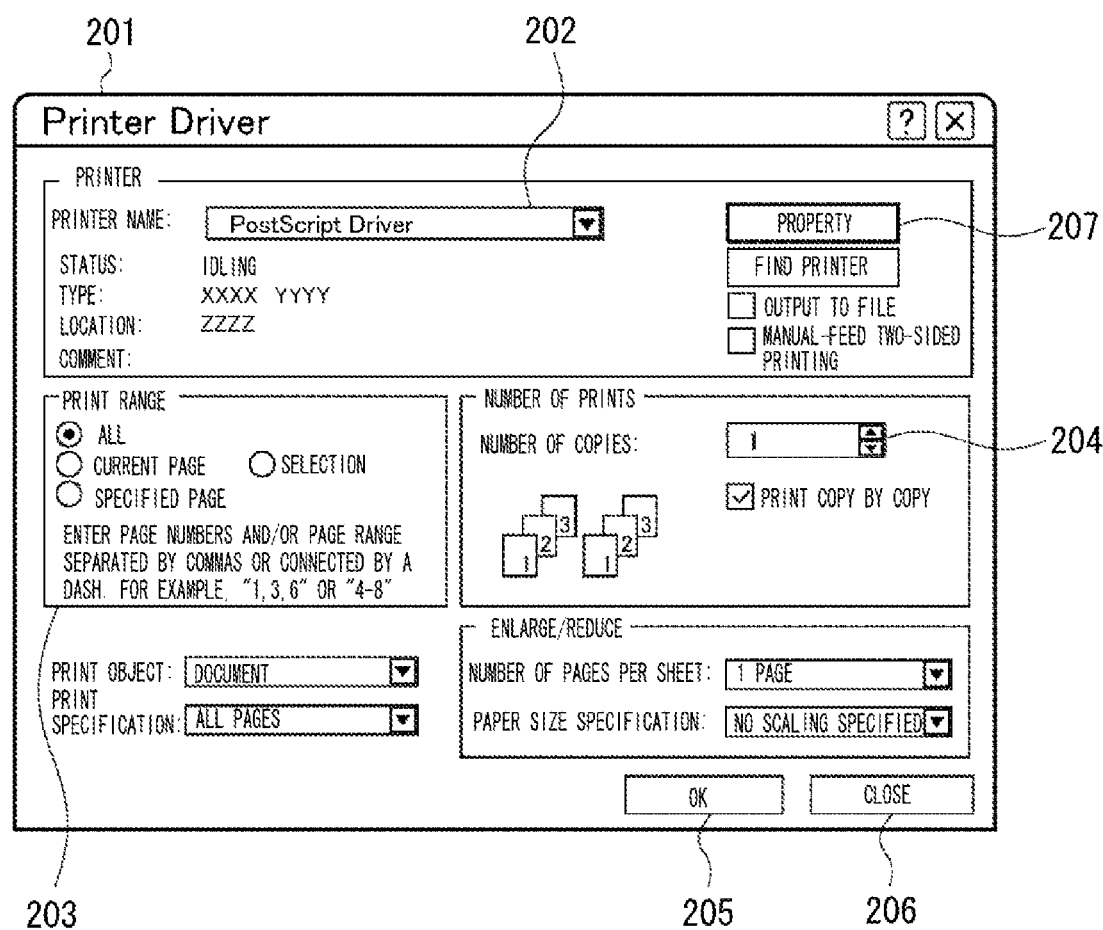
FIG. 2 illustrates a property sheet of a printer driver according to the first exemplary embodiment of the present invention.

FIG. 2 illustrates an example of a print dialog screen displayed when issuing a print instruction from a common application. FIGS. 3 through 7 each illustrates an example of a printer driver screen including an exception page setting and a print attribute setting. Now, the operation and control according to the present exemplary embodiment will be described below with reference to FIGS. 2 through 7.

First, in printing a document generated by the user using an application, a print dialog screen through which the user issues a print instruction provided by the application, is displayed. The print dialog screen includes a menu through which the user selects a printer name of an output destination and a button for opening a property screen of the printer driver corresponding to the selected printer.

The printer driver useful for the print control program of the present invention is called up upon pressing of the button for opening the property screen and provides a GUI for issuing an instruction for performing a print setting related to the print operation by the printer 3000. The user can input a setting parameter for a desired print attribute (print output processing condition data) by operating the keys via the operation screen.

The printer driver sends the user print attribute setting input via the GUI together with desired image data to a destination such as a printer, via a communication medium such as a network.

FIG. 2 illustrates an example of a print dialog screen 201 displayed in issuing a print instruction from the application. The print dialog screen 201 is provided by each application. Setting items in the print dialog screen 201 includes a sending destination selection field 202 for selecting a target output destination.

By the operation via the selection field 202 displayed on the print dialog screen 201, the user selects a desired output destination device in the system.

A page setting control 203 is used for selecting a page to be printed and output from a print job. The user (operator), using the page setting control 203, can make a determination as to which page of print target data that is generated using application software operating on a client computer, is output.

The user can select a page to be printed and output the page using a device such as the printer in the system via the page setting control 203. Thus, the user can perform printing of all the pages, or a specific page(s) without printing all the pages.

A print number setting control 204 is used for designating an output number of a job to be printed and output by the device such as the printer in the system. By moving a pointing cursor to the position of the print number setting control 204 and clicking an arrow in a scroll bar, the user can increase or decrease the number of the output number of the job.

A property button 207 is used for performing a detailed setting as to the destination device selected via the destination selection field 202. When the property button 207 is pressed by the user, various detailed screens illustrated in FIGS. 3 through 7 are displayed on the display of the computer.

After the desired setting has been performed by the user via the various operation screens illustrated in FIGS. 2 *through* 7, the user presses an OK key 205 to start print processing according to the print setting desired by the user. When canceling the print setting processing, the user presses a cancel key 206. When the user presses the cancel key 206, the control unit suspends the print setting processing, discards the current print setting, and terminates the display on the print dialog screen 201.

FIGS. 3 through 7 each illustrates an operation screen (GUI) displayed on a screen of a client computer when the user clicks the property button 207 on the operation screen illustrated in FIG. 2. As described above, the screen is a GUI for performing a print setting, which is provided by the printer driver.

The screen includes a plurality of tab sheets such as "page setting", "finishing", "paper feed", "print quality", and "special features". When the tab is clicked by the user, a screen for performing a setting is displayed as to various detailed print output conditions such as the "page setting", a setting related to the "finishing", the "paper feed", the "print quality", and the "special features".

Figure 3:
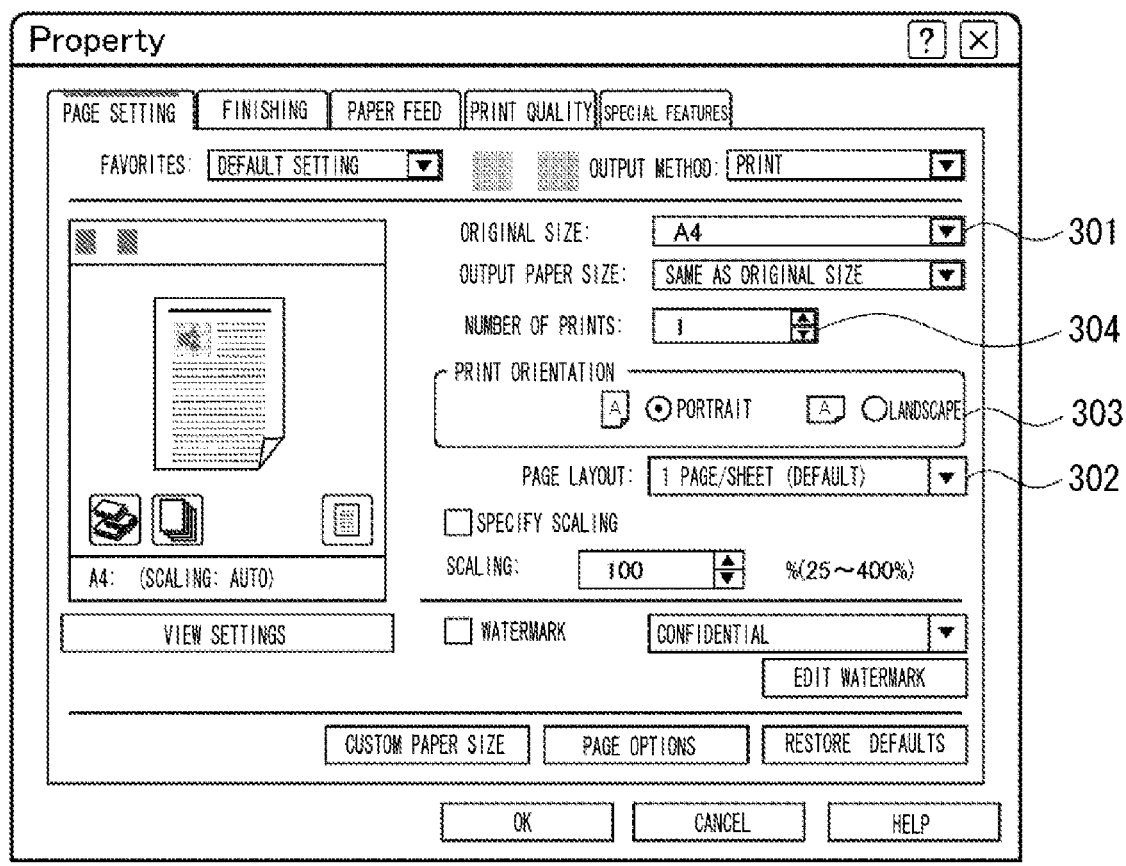
FIG. 3 illustrates a page setting sheet of the printer driver according to the first exemplary embodiment of the present invention.
Figure 4:
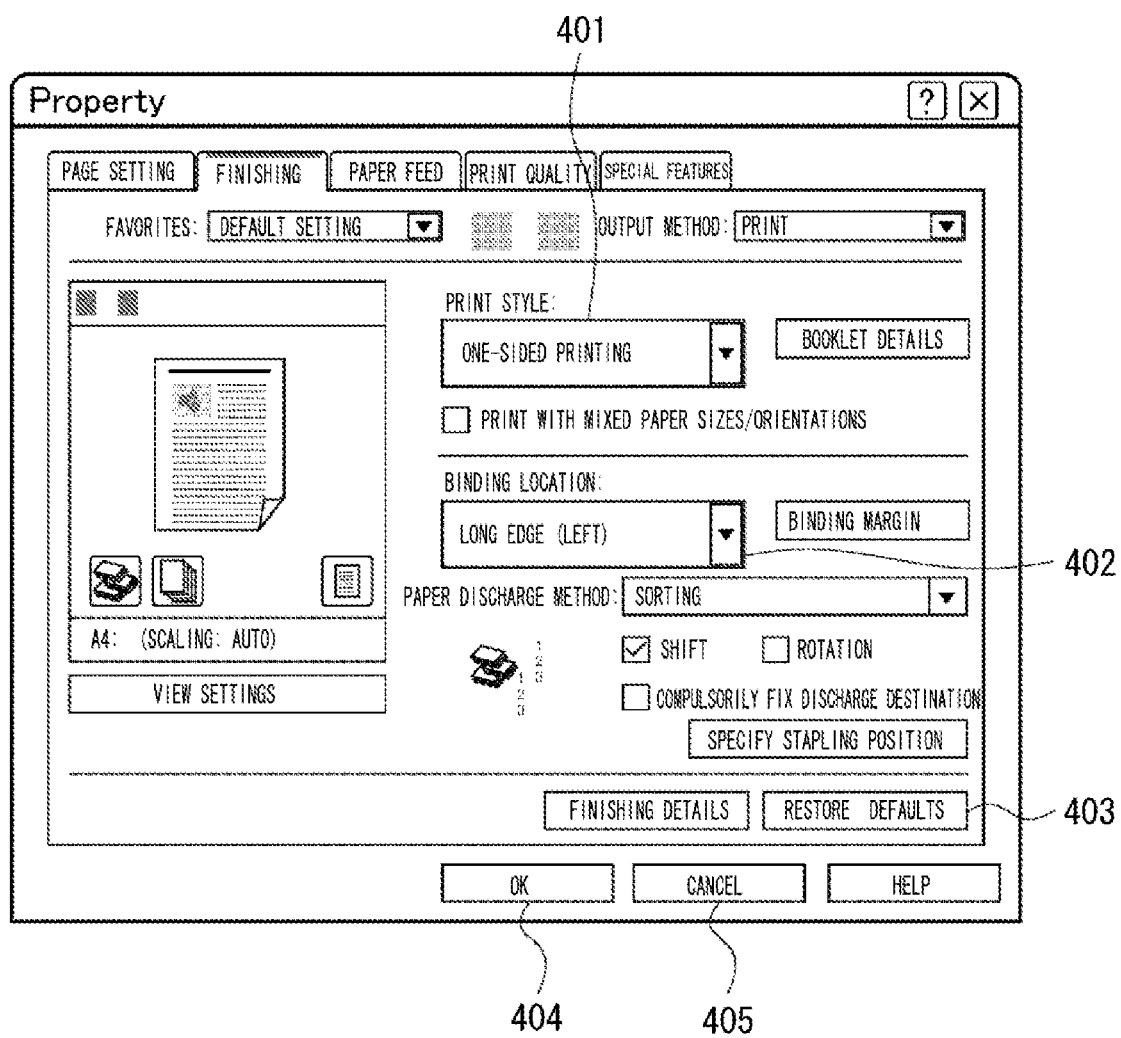
FIG. 4 illustrates a finishing sheet of the printer driver according to the first exemplary embodiment of the present invention.

In the examples illustrated in FIGS. 3 and 4, the screen has a configuration similar to a conventional printer driver which is commonly used.

FIG. 3 illustrates an example of a print setting screen of the printer driver displayed on the CRT display 110 when the user has pressed the "page setting" tab. The screen illustrated in FIG. 3 includes a paper size setting unit 301 with which the user can set the paper size of a recording paper used in a job to be printed.

A layout setting unit 302 is used for selecting a layout mode for arranging and generating document image data for a plurality of pages on one side of one recording paper (sheet). Using the layout setting unit 302, the user can input an instruction and select from plural alternatives a number of pages which are to be arranged and generated on one side of a recording paper.

A paper orientation setting unit 303 is used for performing a setting as to an orientation of printing for the job desired by the user from among a plurality of alternatives such as portrait and landscape. A print number setting unit 304 is used by the user for setting a print number of the job to be processed.

As described above, by the operation of the each setting field on the page setting screen illustrated in FIG. 3, the user can perform desired print settings.

When the user presses the "finishing" tab, the CPU (control unit) 101 opens the GUI of the printer driver and displays the operation screen illustrated in FIG. 4 on the CRT display 110. The screen includes various detailed setting fields such as a discharge method setting field for setting a finishing manner and a stapling position, and a printing method such as one-sided printing, two-sided printing, and bookbinding printing, which are unique setting information related to the selected printer.

For example, with the setting in the display example, the CPU 101 can perform processing of a print job using the printer selected by the user, according to the two-sided print mode set via a setting field 401 of the operation screen illustrated in FIG. 4. In addition, the CPU 101 can add a control command to the print job so that the printer performs the two-sided print processing according to the long-edge binding setting in the two-sided print mode set via a setting field 402. Furthermore, when the user operates a default key 403 on the operation screen in FIG. 4, the CPU 101 can perform control so as to return the print detailed setting in the operation screen of each tab sheet to a default value.

When the user presses an OK key 404, the user setting is entered and then the process returns to the screen illustrated in FIG. 2. When the user presses (i.e., issues an instruction) a cancel key 405, the CPU 101 nullifies the user setting and then the process returns to the screen in FIG. 2.

Similarly, although not shown here, by pressing the "paper feed" tab, the user can designate a paper feed stack, and by pressing the "print quality" tab, the user can make a selection as to a resolution and a halftone setting.

Now, the method for performing a setting for some of the pages or a specific page range different from the setting for the entire job will be described below. Performing a setting for some of the pages or a specific page range other than the setting for the entire job is referred to as "performing an exception page setting".

Figure 5:
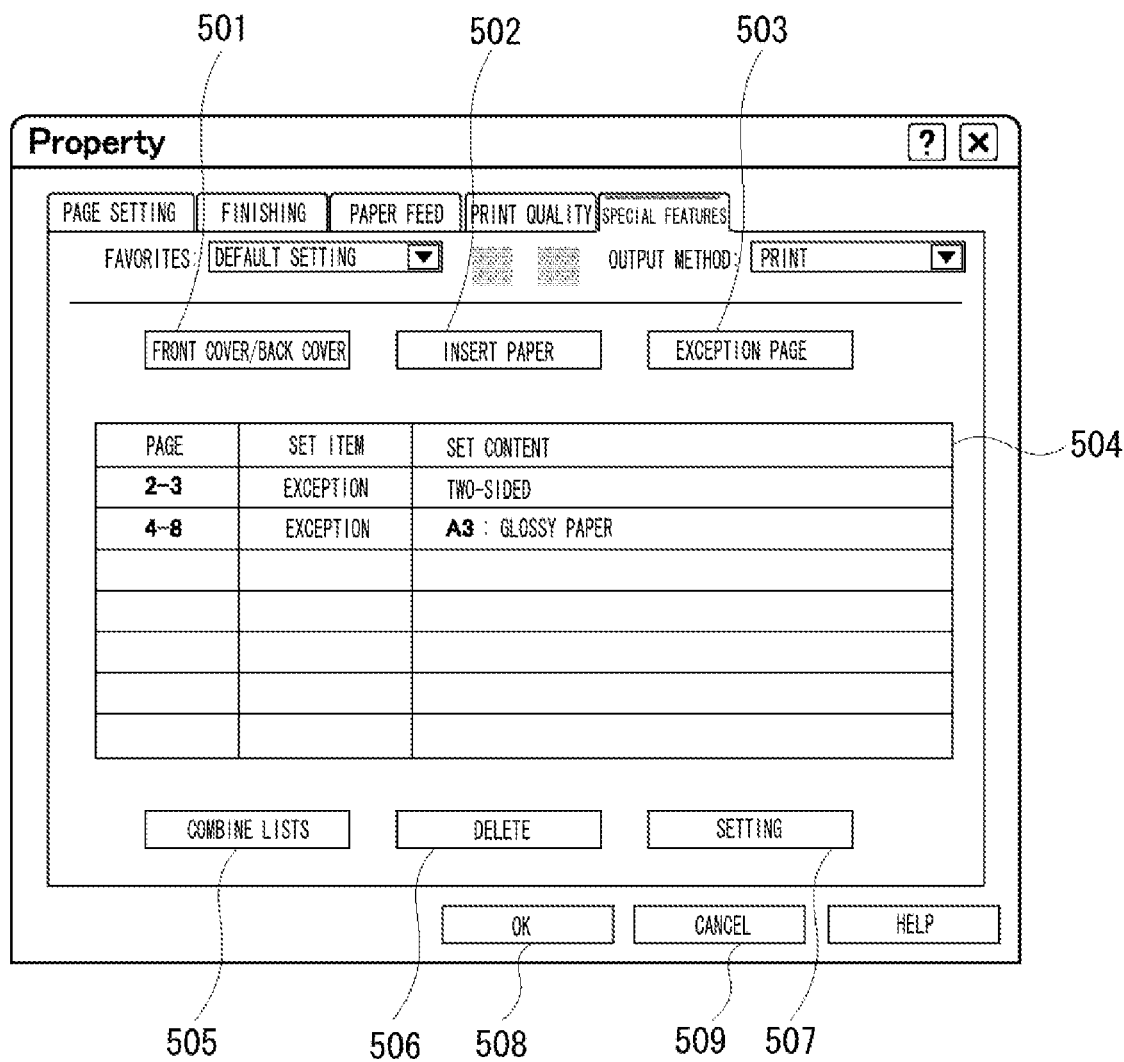
FIG. 5 illustrates a special features setting sheet of the printer driver according to the first exemplary embodiment of the present invention.

FIG. 5 illustrates an example of an operation screen displayed when the "special features" tab is pressed by the user. The screen is a sheet for setting print attributes for a specific page or page range which are different from the print attributes set for the entire job, using the "page setting" screen (FIG. 3), "finishing" screen (FIG. 4), the "paper feed" screen, and the "print quality" screen.

The sheet includes a button 501 for setting a top cover and a back cover aside from text data. A button 502 is used for setting a paper to be inserted aside from the text data.

A table 504 is used for displaying a list of items which are set differently from the entire setting via the operation of the buttons 501 through 503. The table 504 includes and displays from right to left a column of the setting target page or page range, a setting item column, and a setting content column.

It is to be noted that this display is a mere example, and other form and other items can be used. A list combination button 505 is used for combining lists of the settings in the case where, with respect to special feature items listed in the table 504 designated by the user, the same settings are made for adjacent pages or page ranges.

The setting lists are combined by selecting the adjacent settings desired to be combined from among the special feature setting lists 504 and by pressing the list combination button 505. A delete button 506 is used for deleting a setting from the special feature settings listed in the special feature setting list 504 generated by the user.

The setting is deleted by selecting a setting to be deleted from the special feature setting list 504 and pressing the delete button 506. A setting button 507 is used for changing a setting in the special feature settings listed in the special feature setting list 504 generated by the user.

The change in the setting can be performed by previously selecting the setting to be deleted from the special feature setting list 504 before pressing the setting button 507. The OK button 508 is used to close the operation screen and save the setting contents set via to the operation screen of FIG. 5. And cancel button 509 is used to cancel the setting contents set via to the operation screen of FIG. 5.

Figure 6:
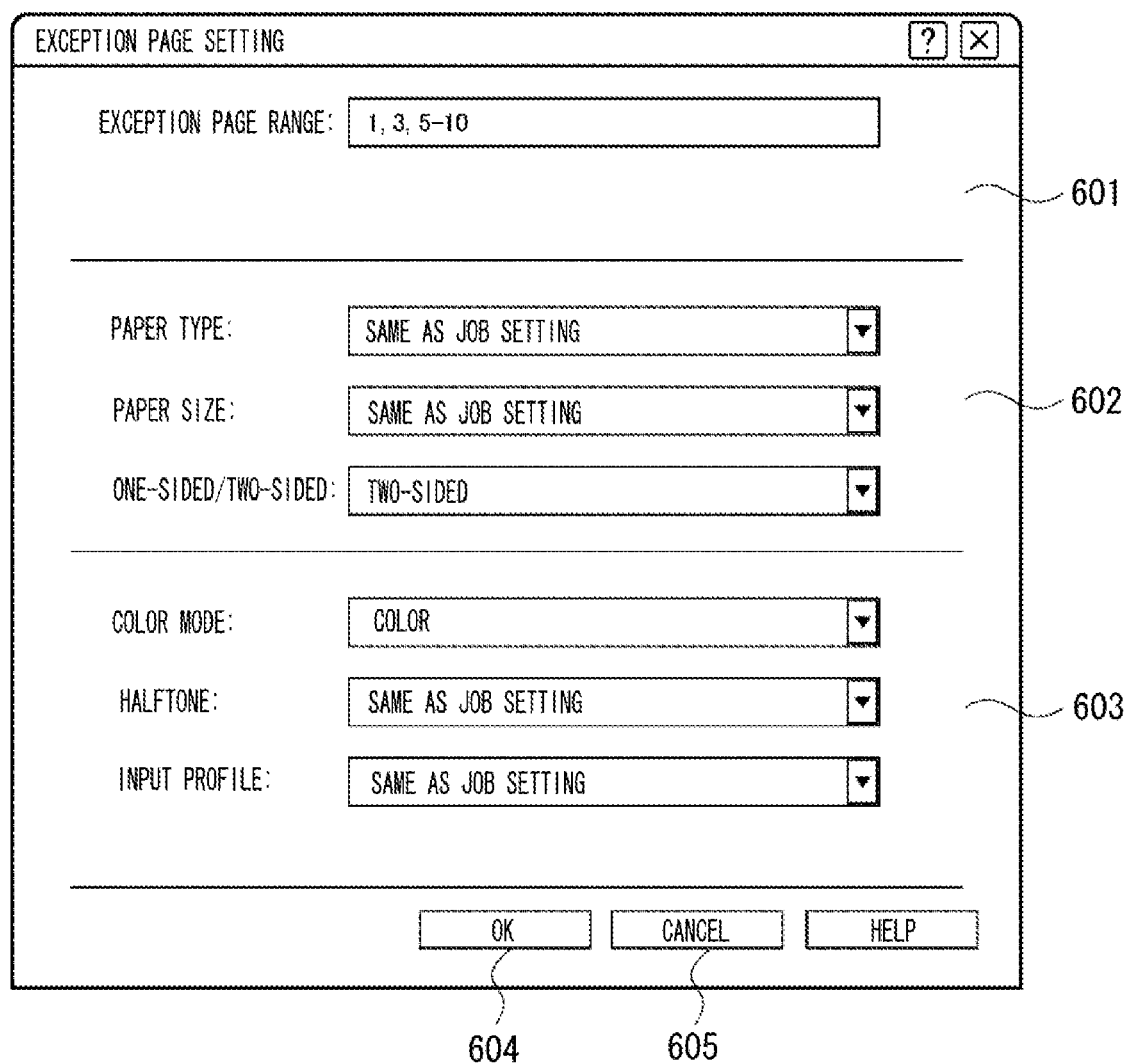
FIG. 6 illustrates a detailed setting dialog box of the printer driver for an exception page according to the first exemplary embodiment of the present invention.

FIG. 6 illustrates an example of a dialog box displayed when the user presses the exception page button 503 in the special setting property sheet in FIG. 5. The user performs a setting different from the setting for the entire job, on a specific page or page range in the dialog box.

A control 601 is used for setting a page or page range. When designating a specific page, the user enters the same page number for a start page column and an end page column. Thus, a value set by the control process described below is applied only to the designated page.

A control 602 is used for performing a setting different from the entire job, on the page or page range set via the control 601. By the control 602, the user can perform a setting as to a print medium. More specifically, by the control 602, the user can perform a setting as to print medium, that is, a paper type, a paper size, and whether the printing is performed on one side or two sides.

A control 603 is used for performing a setting different from the setting for the entire job, on the page or page range set via the control 601. By the control 603, the user can perform a setting as to color. More specifically, by the control 603, the user can perform a setting as to a color mode, halftone, and an input profile.

After the user performs the desired setting via the controls 601 through 603 in FIG. 6, when an OK key 604 is pressed, the user can apply the desired setting. When canceling the applied setting, the user presses a cancel key 605. The printer driver which receives the instruction for canceling the setting from the user, discards the content of the current setting, and then terminates the display in FIG. 6.

Using the "special features" tab sheet (FIG. 5) and the "exception page" dialog box (FIG. 6) described above, the user can perform an exception page setting. The above is a first method for performing an exception page setting.

The printer driver according to the present exemplary embodiment can use a second method for performing the exception page setting. The second method will be described below with reference to FIG. 18.

Figure 7:
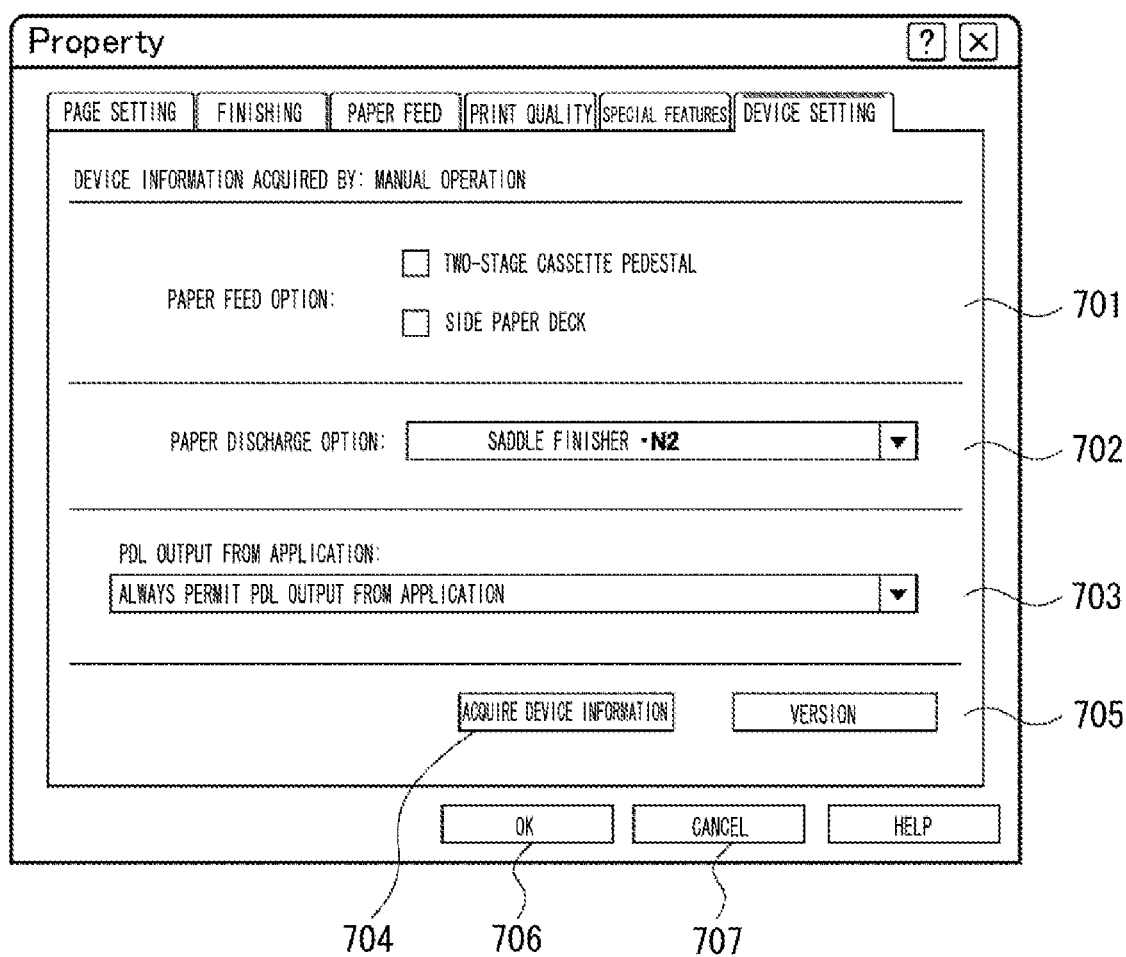
FIG. 7 illustrates a device setting sheet of the printer driver according to the first exemplary embodiment of the present invention.

FIG. 7 illustrates an example of a dialog box displayed when the printer driver is opened from a menu for setting the printer. In the dialog box, a "device setting" sheet is added and displayed. Using the "device setting" tab sheet in FIG. 7, the user can acquire device configuration information and perform a setting for the printer driver.

A control 701 is used for setting a state of mounting of a paper feed option. A control 702 is used for setting a mounting condition of a paper discharge option. After the user performs a desired setting via the controls 701 and 702 in FIG. 7, when an OK key 706 is pressed, the desired setting is entered. When canceling the applied setting, the user presses a cancel key 707. The printer driver which receives the instruction for canceling the setting from the user, discards the setting content of the current setting, and then terminates the display in FIG. 7.

A control 703 is used to designate a work of the printer driver when the application generates a PDL code. This control 703 includes in "Always Permit PDL Output From Application", "Always Prohibit PDL Output From Application", "Depends on Printer Driver Settings". When "Always Permit PDL Output From Application" is selected, the application always generates the PDL code. In this case, the printer driver performs drawing processing through the drawing system of the OS.

When "Depends on Printer Driver Settings" is selected, the application does not generate the PDL code. The button 704 is used to acquire the device information. The button 705 is used for display the dialog that includes the version information of the printer driver.

As described above, first, the client user sets a desired output condition of the print processing conditions including various detailed settings and exception page settings via various print setting screens in FIGS. 2 through 7.

<Configuration of Printer Driver>

Figure 8:
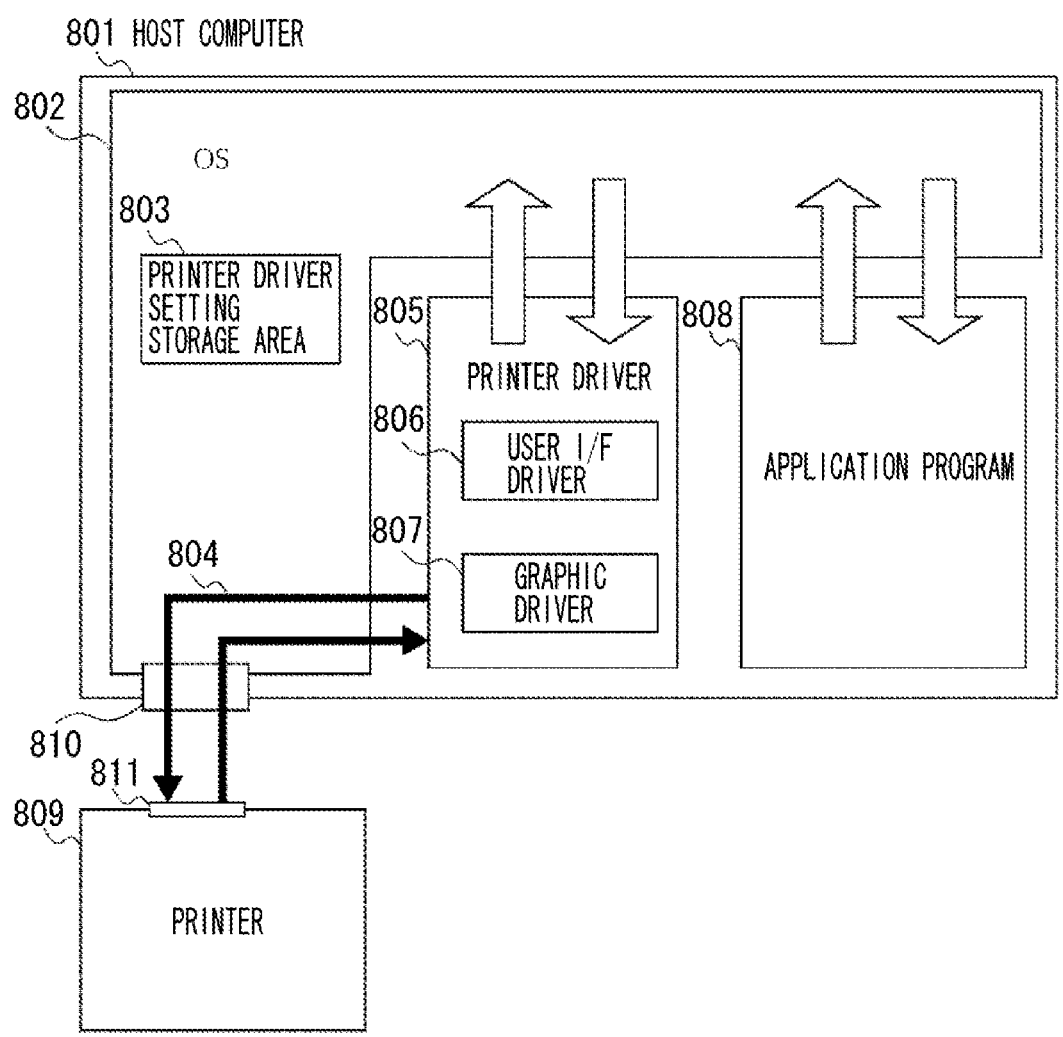
FIG. 8 illustrates a software module configuration of a client computer according to the first exemplary embodiment of the present invention.

FIG. 8 illustrates a software configuration of a client personal computer (PC) including the printer driver for the print control program according to the present exemplary embodiment. A host computer 801 corresponds to the host computer 1000 in FIG. 1, and has an OS 802 installed.

In addition, a printer driver 805 and application software (program) 808 are installed on the OS 802 and controlled by the OS 802.

The printer driver 805 includes a user I/F driver 806 that displays a user I/F and stores a setting, and a graphic driver 807 that converts a printing and rendering command instructed from the application program 808 into a code that can be interpreted by the printer. The user I/F driver 806 displays a print setting property sheet illustrated in FIGS. 3 through 7 when the user instructs print setting from the application program 808 via the OS 802.

A printer driver setting storage area 803 is provided in a storage area managed by the OS 802. The print attribute set by the user via the user I/F driver 806 is stored in the printer deriver setting storage area 803. Furthermore, the user I/F driver 806, the graphic driver 807, and the application program 808 can access the printer deriver setting storage area 803 via the OS 802 to read the print attribute set by the user.

Moreover, a communication I/F 810 of the host computer 801 is in communication with a communication I/F 811 of a printer 809 via a communication medium 804 such as a network. The graphic driver 807 is capable of sending print data to the printer 809 via the OS 802. Furthermore, the graphic driver 807 can acquire printer configuration information and status information via the OS 802.

<Print Job Generation Control Procedure>

Figure 9:
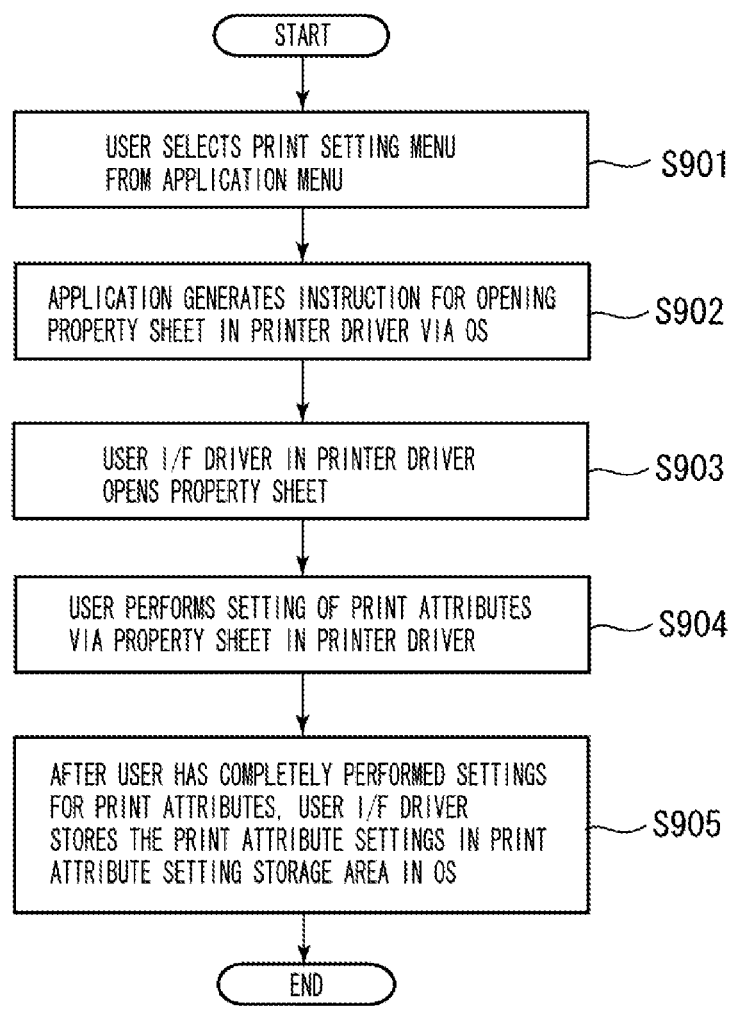
FIG. 9 is a flow chart illustrating processing in which a user performs print attribute setting with the printer driver according to the first exemplary embodiment of the present invention.
Figure 10:
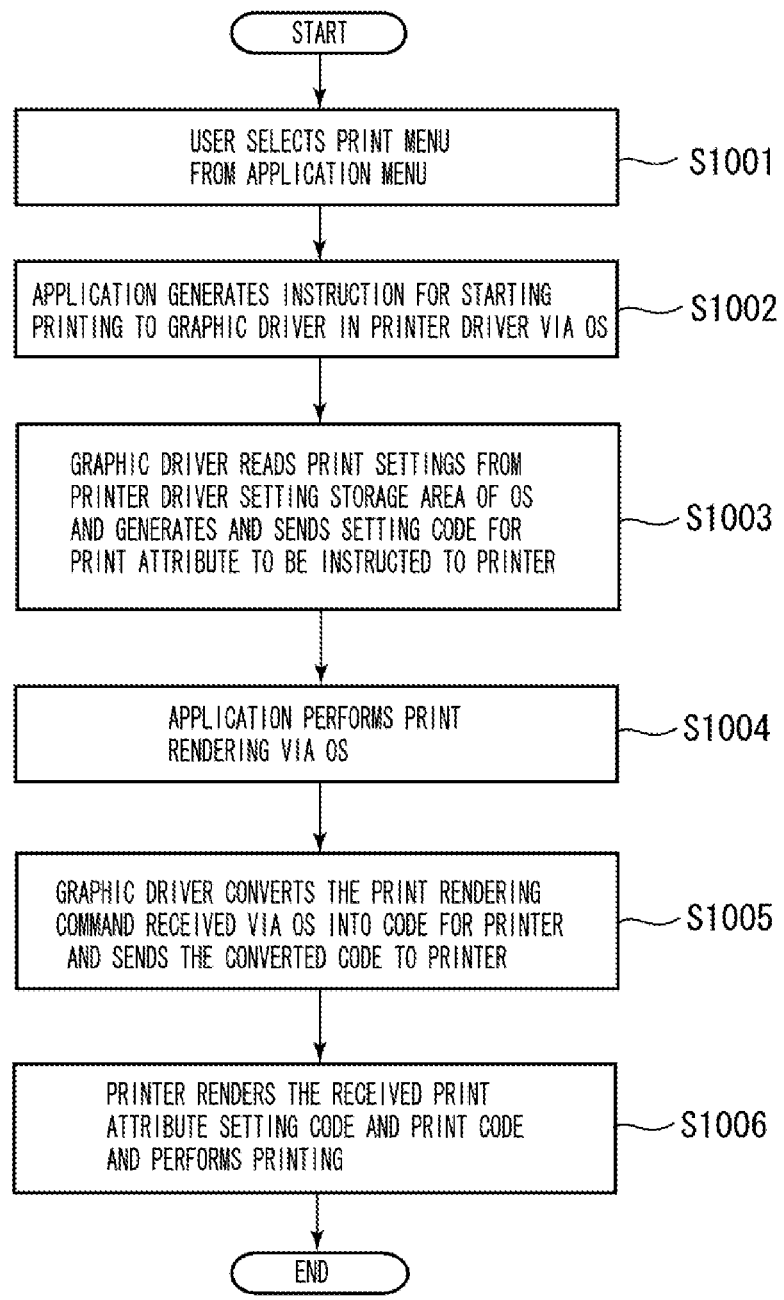
FIG. 10 is a flow chart illustrating processing for controlling generation of a print job according to the first exemplary embodiment of the present invention.

Now, a flow of processing will be described below in which first, the user selects a print menu from the menu of the application, then sets a print attribute on the printer driver, and then a job is printed and output. FIG. 9 and FIG. 10 are flow charts illustrating processing by the host computer from when the user instructs printing until printing is performed.

Referring to FIG. 9, in step S901, the user selects a print setting menu from the application software menu. Then, the application program 808 displays the print dialog screen illustrated in FIG. 2.

In step S902, when the user presses the property button 207 in the print dialog screen, the application program 808 calls an application programming interface (API) of the OS 802.

The API call is made to the OS 802 from the application program 806 to instruct display of a property sheet for setting a print attribute of the printer driver 805 selected via the print dialog screen. According to the instruction, the OS 802 activates the user I/F driver 806 to generate an instruction for displaying a print attribute setting property sheet.

In step S903, the user I/F driver 806 of the printer driver 805, upon receiving the instruction for displaying the property sheet from the OS 802, performs control so that the print attribute setting property sheet illustrated in FIG. 3 is displayed on the CRT display 110.

In step S904, the user performs a desired print attribute setting on the property sheet in FIGS. 3 through 6 described above, and then the printer driver 805 inputs the print attribute setting. The user, after performing the print attribute setting, presses the OK button 404 in the property sheet in FIG. 4 to enter the print attributes that are set.

After the OK button 404 is pressed, in step S905, the user I/F driver 806 stores the print attribute setting value set by the user in the printer deriver setting storage area 803 within the OS 802 by calling the API of the OS 802. Thus, the print attribute setting and storing of the setting value for the print attribute are completed.

In step S1001 of FIG. 10, in order to print a document, the user selects a print menu from the menu of the application software. Then, the application program 808 displays the print dialog screen illustrated in FIG. 2.

In step S1002, when the user presses the OK key 205 in the print dialog screen, the application program 808 calls the API of the OS 802 to issue a print start instruction to the printer driver 805.

In step S1003, the graphic driver 807, which constitutes the printer driver 805, upon receiving the print start instruction, reads the print attribute setting value stored in the printer deriver setting storage area 803 of the OS 802. Then, the graphic driver 807 generates a print attribute setting command directed to the printer 809 according to the read print attribute setting value.

In step S1004, the application program 808 generates a rendering command via the OS 802 according to data of a printing target document. In step S1005, the CPU 101 sends the rendering command to the graphic driver 807 via the OS 802, and then the graphic driver 807 converts the received rendering command into print data that can be interpreted by the printer 809.

In step S1006, the printer driver 805 generates a print job including the print attribute setting command and the print data, and sends the generated print job to the printer 809. After that, the printer 809 performs rendering based on the received print rendering code and performs print processing on the print paper.

In the case where an exception page setting is performed, the CPU 101 generates a print job defining a basic print setting, which is a print setting for the entire print job, and an exception setting, for which a page range is designated. The print job itself on which an exception page setting is performed is publicly known. Accordingly, a detailed description thereof is omitted here.

According to the above-described procedure, the user sets a print attribute to output a print job.

<Flow of Constraint Processing>

Now, control related to constraint processing by a printer driver will be described below. FIGS. 11 through 14 illustrate an operation performed during processing for constraining a function by the printer driver on the user I/F.

An application and a printer driver such as a hot folder that performs a print attribute setting, include functions that can not or should not be set at the same time. Some functions do not effectively operate, for example, an overhead projector (OHP) sheet and two-sided printing should be set to be unselectable at the same time. If an OHP sheet (transparent sheet) is selected as a print medium, when two-sided printing is performed, an obtained output cannot be used as a print product.

Further, if the printer cannot perform stapling when a thick print medium is used, for example, the function of the printer is restricted. Therefore, stapling should be set unselectable on the user I/F of the printer driver.

An operation on the user I/F for items that cannot be functionally and meaningfully set, is called "constraint processing". Now, the constraint processing by the printer driver will be described.

As an example, when bookbinding printing is selected as the print style 401 in the "finishing" sheet (FIG. 4) in the printer driver property sheet, the setting for the binding method setting field 402 is set to be constrained (null). This operation will be described below.

Figure 11:
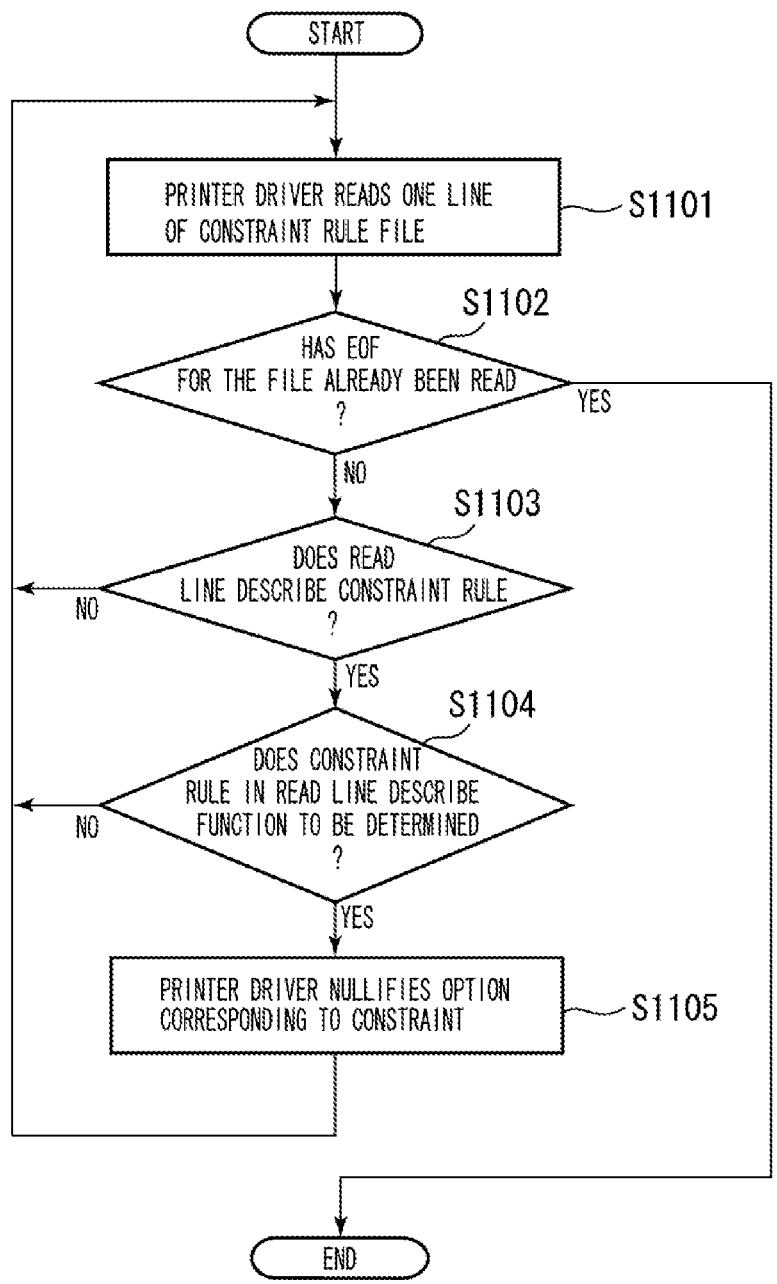
FIG. 11 is a flow chart illustrating a procedure for constraint processing according to the first exemplary embodiment of the present invention.
Figure 13:
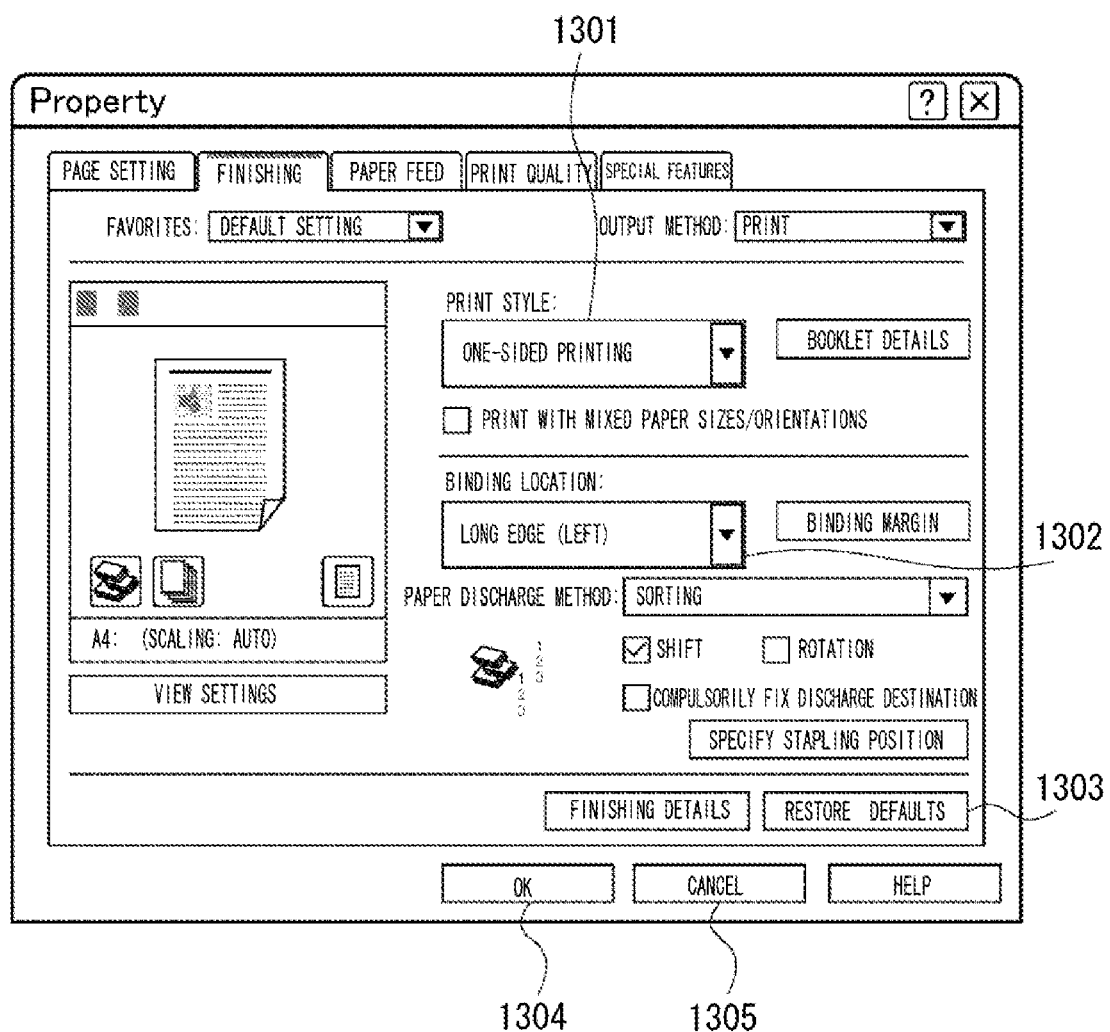
FIG. 13 illustrates a finishing sheet of the printer driver according to the first exemplary embodiment of the present invention.
Figure 14:
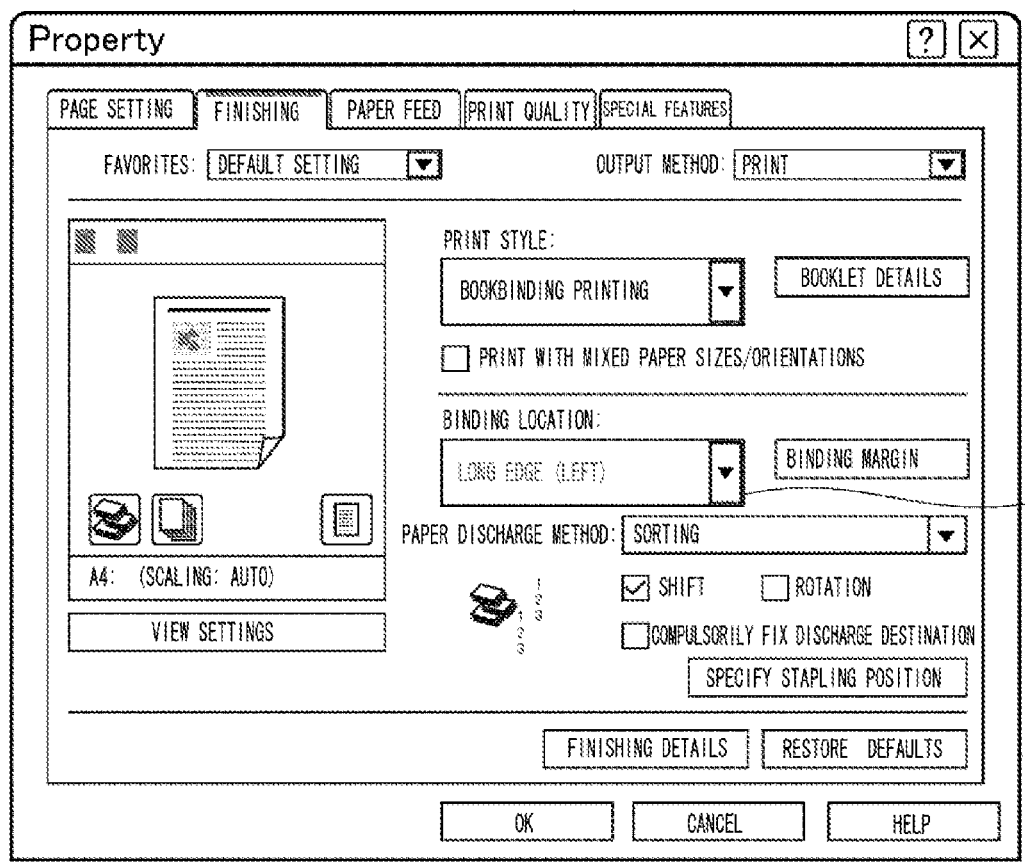
FIG. 14 illustrates a finishing sheet of the printer driver according to the first exemplary embodiment of the present invention.

FIG. 11 is a flow chart illustrating the processing for controlling the constraint processing by the printer driver. FIG. 13 illustrates a default state of the "finishing sheet" (FIG. 4). A control 1302 is used to designate a binding location. A button 1303 is used to return to the default condition from the setting contents designated via to the finishing sheet of FIG. 13. A button 1304 is used to close the operation screen of FIG. 13 and save the setting contents set via to the finishing sheet of FIG. 13. A button 1305 is used to cancel the setting contents set via to the finishing sheet of FIG. 13. FIG. 14 illustrates a result of the constraint processing performed when the "bookbinding processing" is selected as the print style in the "finishing sheet" (FIG. 4).

FIG. 12 illustrates one part of a constraint rule file that constitutes the printer driver. The constraint rule file is usually stored in the same directory as the printer driver, and can be accessed by the printer driver itself.

It is noted that the constraint rule file is a mere example and another format and a file system can be used. Furthermore, as long as the constraint processing can be performed, other means such as the program that can control the constraint processing are also feasible.

The body 1201 of the constraint rule file is described in FIG. 12. The constraint rule file is described in a text format, whose each line includes a keyword starting from "%" and a parameter defined based on the keyword. The keyword and the parameter are separated by a colon (":").

A line 1202 describes a version of the constraint rule file. The keyword "%ConstraintsFileVersion" is used and the parameter is "1.0", which indicates that the version of the constraint rule file is 1.0. The constraint file includes other information, however, in this example, only the lines related to the present exemplary embodiment are extracted from the actually used lines and illustrated here.

Lines 1203 and 1204 describes the constraint rule for the print style and the bookbinding method. As the format for describing the constraint, the keyword "%Constraints" at the head portion of the line, which indicates the constraint rule, the function that is the source of the constraint, the options of the constraint source function, the function that is the object of the constraint, and then the options of the constraint object function are described in this order.

That is, the definitions of items are made in the order of the items to be determined for constraint, the setting value to be determined for constraint, the items to be constrained, and the values to be constrained. The description of the function and the options of the function are provided with an asterisk ("*") at the head portion thereof.

For example, the line 1203 is interpreted as follows: That is, constraint is set between the print style ("*PrintStyle") and the binding method ("*BindingEdge").

The example shows that when the bookbinding printing ("*Booklet") is selected for the print style ("*PrintStyle"), long-edge binding ("*LongEdge") cannot be selected for the binding method ("*BindingEdge"). The next line is interpreted similar to the above-described rule. Thus, the next line is interpreted to indicate that when the bookbinding printing is selected for the print system, short-edge binding cannot be selected for the binding method.

Now, an operation performed for the constraint processing when the user changes the setting for print system field 1301 from "one-sided printing", which is currently selected, to "bookbinding printing" in the property sheet of the "finishing sheet" (FIG. 4), is described with reference to the flow chart of FIG. 11. The operation starts when the user changes the setting via the printer driver user I/F.

In step S1101, the printer driver 805 reads one line of the constraint rule from the constraint rule file illustrated in FIG. 12. That is, the printer driver 805 reads the first line 1202.

In step S1102, the printer driver 805 determines whether all the constraint rules are read, referring to a description "End of File" (EOF) of the constraint file. If it is determined in step S1102 that the EOF is not read yet (No in step S1102), then the printer driver 805 advances to step S1103.

In step S1103, the printer driver 805 determines whether the read line includes information about the constraint rule. This determination can be made according to whether the keyword is ""%Constraints". If it is determined in step S1103 that the read line does not include the information about the constraint rule (No in step S1103), then the printer driver 805 returns to step S1101. On the other hand, if it is determined that the read line includes the information about the constraint rule (Yes in step S1103), then the printer driver 805 advances to step S1104.

In step S1104, the printer driver 805 determines whether the constraint rule in the read line describes the function to be determined as to constraint. In the present case, the current operation for the constraint processing has been started according to the change in the print style field 1301 ("*PrintStyle") made by the user. Accordingly, the function to be determined as to constraint is the print style field ("*PrintStyle").

Thus, in this processing, the printer driver 805 determines whether the constraint rule in the read line is the constraint rule for the print style ("*PrintStyle") and whether the constraint rule in the read line is the setting value for the bookbinding printing ("*Booklet"). That is, it is determined whether both the item to be determined for constraint and the setting value to be determined for constraint match the condition.

In the example in FIG. 12, the constraint rule 1203 is set for the print style ("*PrintStyle") and for the setting value of the bookbinding printing ("*Booklet") (Yes in step S1104). Thus, the printer driver 805 advances to step S1105. If it is determined in step S1104 that the constraint rule in the read line does not describe the function to be determined as to constraint (No in step S1104), then the printer driver 805 returns from step S1004 to step S1101 to read the constraint rule file again.

In step S1105, the printer driver 805 nullifies the "value to be constrained" in the "item to be constrained", which is an option in the function to be constrained. In the example of FIG. 12, the line 1203 defines that when the print style ("PrintStyle") is set to the bookbinding printing ("*Booklet"), long-edge binding ("*LongEdge") for the binding method ("*BindingEdge") is nullified.

Accordingly, the user I/F driver 806 nullifies the option of the "long edge binding" ("*LongEdge") with respect to the print setting field "binding method". Thus, the user cannot select the long edge binding. After this processing, the printer driver 805 returns to step S1101 to read the next line 1204. For the next line 1204, the printer driver 805 performs processing similar to the above-described processing. When bookbinding printing ("*Booklet") is set for the print style ("*PrintStyle"), more specifically, the printer driver 805 performs the following processing:

Short edge binding ("*ShortEdge") is nullified for the binding method ("*BindingEdge"). Thus, the option of the short edge binding ("*ShortEdge") is nullified. Accordingly, the user cannot select the short edge binding option. By repeating the processing, the printer driver 805 applies the constraint rule file.

The option for the binding method in the "finishing sheet" (FIG. 4) of the printer driver 805 includes only the "long edge binding" and the "short edge binding". In the case of the example in FIG. 11, both of the options are nullified.

Accordingly, the printer driver 805 nullifies the option for the binding method itself and grays out the control for the binding method 1402 as illustrated in FIG. 14. Thus, the user cannot select the option for the binding method. As described above, the printer driver performs the constraint processing.

<Flow of Print Attribute Setting Processing>

Now, the flow of the exception page setting processing during the print attribute setting according to the present exemplary embodiment will be described below. The first method for the exception page setting processing is described above with reference to FIG. 6. Now, a second method for the exception page setting processing, which is a characteristic feature of the present exemplary embodiment, will be described below with reference to FIG. 18.

In the present exemplary embodiment, the entire print job is set as an example such that the paper size is set to "A4" size, the print system is set to "one-sided printing", and the color mode is set to monochromatic printing, and that a document including fifty pages are printed.

Figure 15:
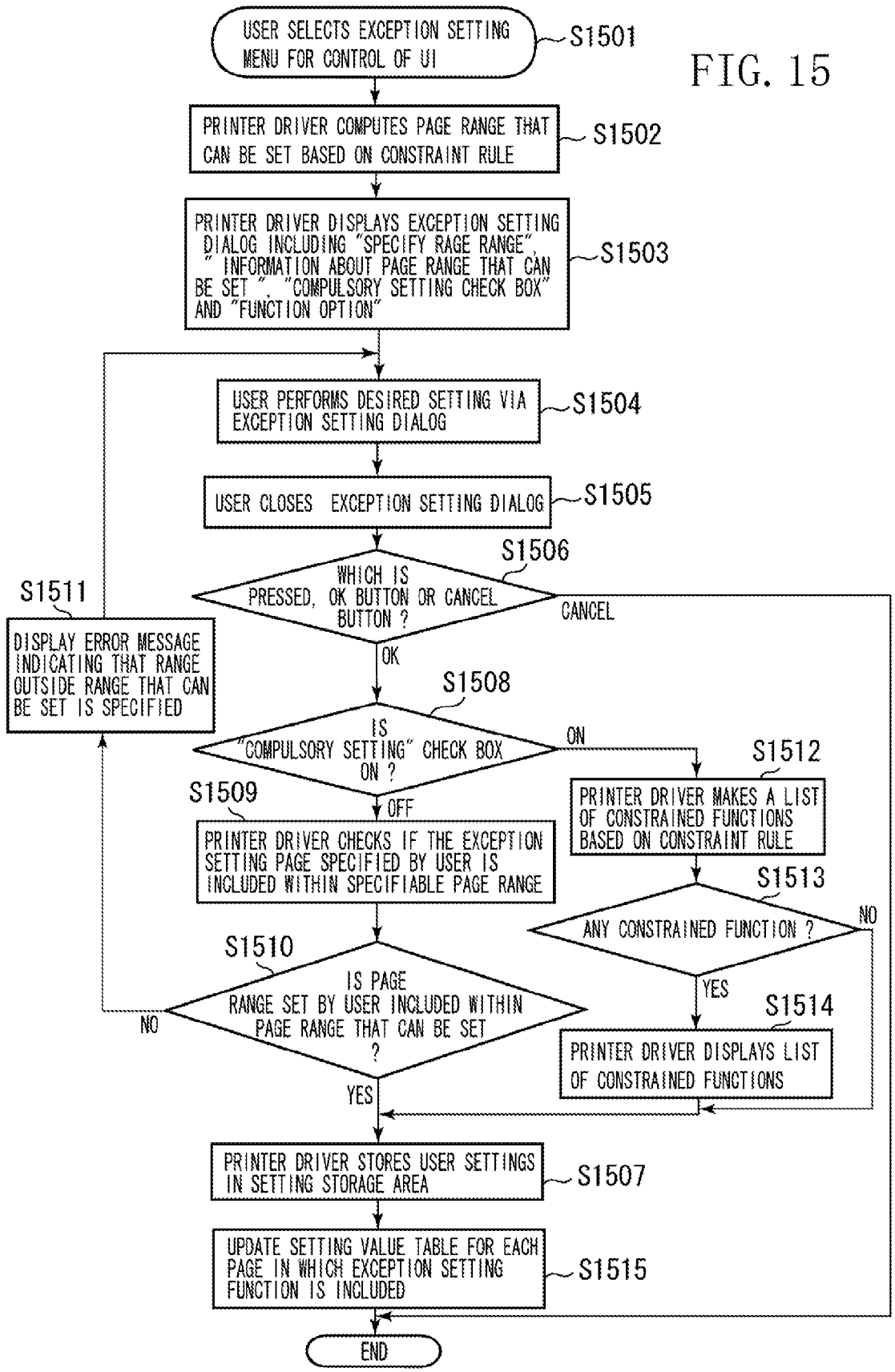
FIG. 15 is a flow chart illustrating a control procedure for exception setting according to the first exemplary embodiment of the present invention.

For the exception setting, a paper of "A3" size is already set for each of pages 21 through 30 of the document and the print system is set to "two-sided printing", and the color mode for pages 10 through 20 is already set to color printing. The method for performing the exception setting is as follows:

In the present exemplary embodiment, the description is made as to a method for performing exception setting, that is, a red, green, blue (RGB) input profile is set to "sRGB" for the pages 10 through 20 when the above-described setting for the entire job and the exception page setting are performed. FIG. 15 is a flow chart illustrating a procedure for controlling the printer driver to perform the above-described exception setting. The operation performed during the processing will be described below according to the flow chart of FIG. 15.

Figure 16:
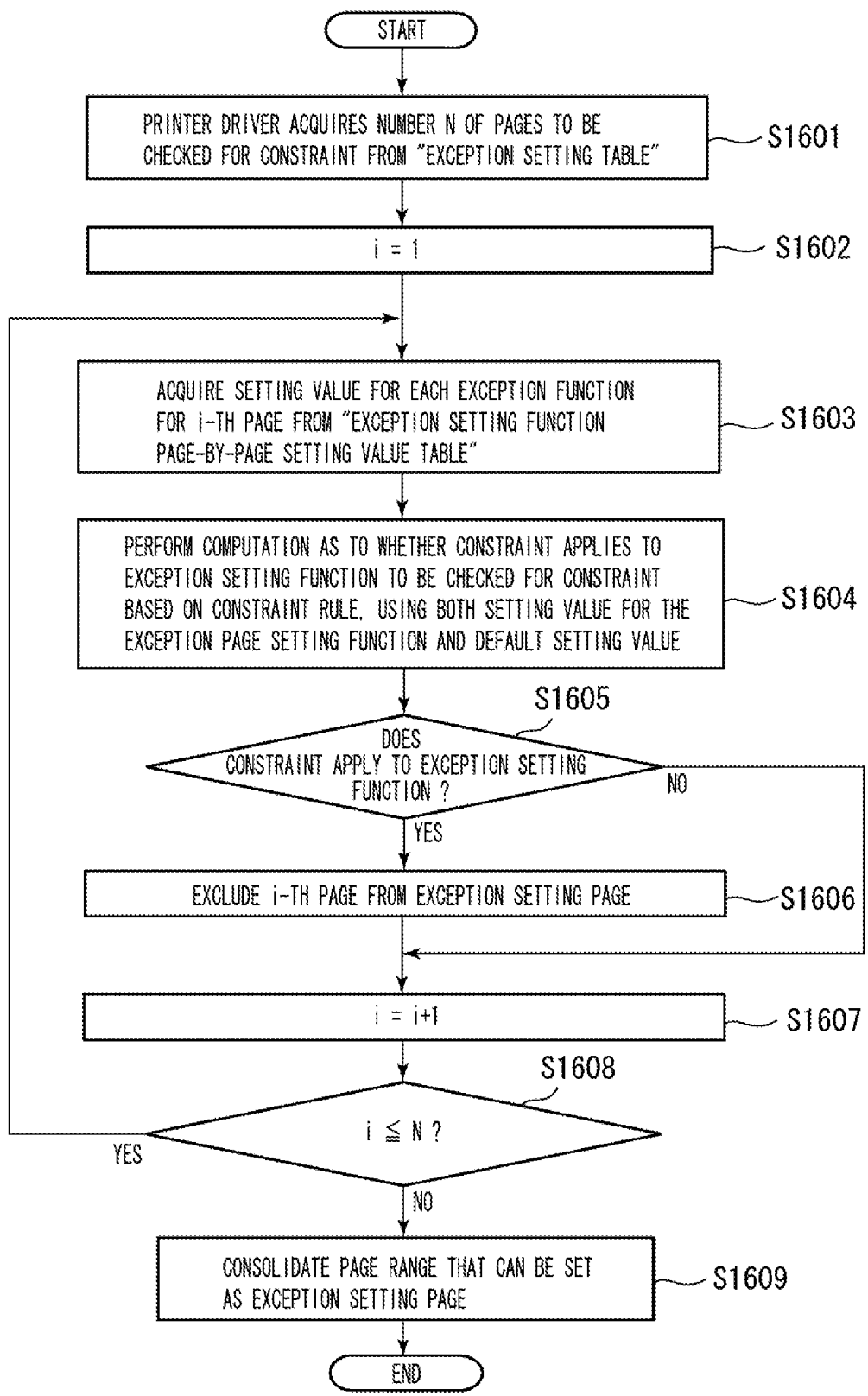
FIG. 16 is a flow chart illustrating a control procedure for hyphenation information computation according to the first exemplary embodiment of the present invention.

FIG. 16 is a flow chart illustrating a detailed operation performed in step S1502 in FIG. 15. In the description below, the processing in step S1502 will be described with reference to FIG. 16. For the constraint rule, the RGB input profile can be set only when the color mode is set to color printing. If the color mode is set to monochromatic printing, the RGB input profile is constrained and thus cannot be set.

Before describing the processing according to the flow charts in FIGS. 15 and 16, the description will be made as to an exception page setting table stored in the printer deriver setting storage area 803 by the printer driver 805.

FIG. 17 illustrates an exception page setting table 1701 stored in the printer driver 805. In the exception page setting table 1701, a column 1714 describes the function of the printer driver 805. A column 1715 describes the setting values for each page in the designated page range.

The function column 1714 includes a list of the functions of the printer driver on which the exception page setting can be performed. In the function column 1714, a print system 1702 are defined, which includes options such as "two-sided printing", "one-sided printing", and "bookbinding printing", and a color mode 1703, a paper size 1704, halftone 1705, and the RGB input profile 1706. In the setting value column 1715, the setting values for each page in the designated page range, which correspond to the functions listed in the function column 1714, are stored.

In the example illustrated in FIG. 17, as the exception page setting, "A3" size is set as the paper size and the print system is set to "two-sided printing" for the pages 21 through 30, and the color mode for the pages 10 through 20 is set to "color printing". Accordingly, in the two-sided printing function column 1702, in the cell for the pages 21 through 30, the setting of "two-sided printing" is described.

The exception page setting table 1701 includes the cell in which the setting value "NULL" is described. This indicates that the exception setting is not set to the specific page of the specific function. That is, to the page of the function for which the setting value is set to "NULL", the setting for the entire job is applied.

In the color mode function column 1703, the color mode is set to "color" for the pages 10 through 20. Accordingly, the setting value describes "color". In the paper size function column 1704, "A3" size is set for the pages 21 through 30. Accordingly, the setting value describes "A3".

In the halftone column 1705, the exception setting is not performed. Accordingly, the value "NULL" is set for all the pages. In the RGB input profile column 1706, the exception setting is not performed. Accordingly, the value "NULL" is set for all the pages, just as in the case of the halftone column 1705.

The printer driver 805, in performing computation for constraint, computes the constraint information for the exception setting according to the flow of processing in FIG. 16 based on the exception page setting table 1701.

Now, with reference to the flow chart of FIG. 15, the procedure in which the user sets the option of the RGB input profile to "sRGB" for the pages 10 through 20 will be described below.

In step S1501, the user selects the exception setting menu via the control of the user interface of the printer driver 805 on which the user desires to perform exception setting. Thus, the processing starts. More specifically, the user opens a user I/F screen 1801 of the printer driver 805 illustrated in FIG. 18 and then opens a "print quality" property sheet 1802.

Then, the user, in order to perform exception setting on the RGB input profile function, points an RGB input profile control 1803 with a mouse cursor, and right-clicks the RGB input profile control 1803. That is, when the RGB input profile control 1803 is right-clicked with the mouse cursor when the RGB input profile control 1803 is being focused, a tool tip for designating the exception setting is displayed.

After this operation is performed by the user, the user I/F driver 806 of the printer driver 805 displays an "exception setting" sub menu in a portion close to a designated subject item 1803 so as to allow the user to select the exception setting menu.

In the above description, the menu is displayed upon right-clicking the RGB input profile control 1803 with the mouse cursor. However, the present exemplary embodiment is not limited to this. The menu can also be displayed by left-clicking of the RGB input profile control 1803 when a specific key (a control key and the like) is being pressed by the user. By performing the processing in this step, the user designates the exception setting for the RGB input profile. Accordingly, the printer driver, in the steps beyond, computes necessary information such as the constraint information to display a dialog for the exception setting.

In step S1502, the printer driver 805 computes the constraint information for the RGB input profile according to the constraint rule illustrated in the example in FIG. 12. The processing in step S1502 is illustrated in detail in the flow chart of FIG. 16.

FIG. 16 is a flow chart illustrating the steps performed by the printer driver to determine which page can be set to be exception. In step S1601, the printer driver 805 acquires a number of pages to be checked for constraint, namely, the page number of a last page on which constraint is set, from the exception page setting table 1701.

From the description in a last setting table of the exception page setting table 1701, it is known that the last exception-set page is the page 30. In the steps beyond in the flow chart of FIG. 16, the printer driver 805 computes constraint for each page of the pages 1 through 30.

In step 1602, the printer driver 805 substitutes "i", which is a variable of a number of pages to be checked for constraint, with a value "1".

In step S1603, the printer driver 805 acquires the exception setting value for the i-th page (first page) from the exception page setting table 1701. From the exception page setting table 1701 in FIG. 17, it is known that the exception setting for the first page is "NULL" as to all functions.

Next, in step S1604, the printer driver 805 determines whether the RGB input profile can be set for the first page, using the method described in the "<Flow of Constraint Processing>" described above. The setting of the RGB input profile can be performed only when the color mode is set to "color". If the color mode is set to "monochromatic", the setting of the RGB input profile is constrained.

In the exception page setting table 1701, the color mode for the first page is set to "NULL". The description "NULL" is set for the entire job and the color mode for the entire job is set to "monochromatic". Accordingly, the constraint rule is applied and it is determined that the setting of the RGB input profile for the first page cannot be performed.

Thus, the setting of the RGB input profile for the first page is constrained in step S1605, and accordingly, in step S1606, the printer driver 805 excludes the first page from the pages on which exception is set.

In step S1607, the printer driver 805 increments the counter "i" of the page by one and processes a next page. In step S1608, the printer driver 805 determines whether the i-th page exceeds an N-th page.

If it is determined in step S1608 that the i-th page does not exceed the N-th page (Yes in step S1608), then the printer driver 805 returns to step S1603. For the pages 2 through 9, the processing and determination similar to that performed for the first page are made. Accordingly, the description as to the pages 2 through 9 is omitted here.

Now, the description is made as to a case where "i"=10, namely, the processing performed on the page 10.

In step S1603, the printer driver 805 acquires the exception setting value for the page 10 from the exception page setting table 1701. In the exception page setting table 1701 in FIG. 17, the exception setting for the page 10 is such that "color" is set for the color mode and all the other functions are set to "NULL".

In step S1604, the printer driver 805 determines whether the RGB input profile can be set for the page 10, using the method described in the above "<Flow of Constraint Processing>", just as in the case of the processing for the first page. The setting of the RGB input profile can be performed only when the color mode is set to "color".

In the example in the exception page setting table 1701 in FIG. 17, the color mode for the page 10 is set to "color". Accordingly, the constraint rule is applied and it is determined that the RGB input profile can be set for the page 10. Similarly, it is determined that the setting of the RGB input profile can be performed for the pages 11 through 20

Now, the description is made as to a case where "i"=21, namely, the processing performed on the page 21.

In step S1603, the printer driver 805 acquires the exception setting value for the page 21 from the exception page setting table 1701. In the exception page setting table 1701 in FIG. 17, the exception setting for the page 21 is such that "A3" is set for the paper size and all the other functions are set to "NULL".

In step S1604, the printer driver 805 determines whether the RGB input profile can be set for the page 21, using the method described above. In the exception page setting table 1701 in FIG. 17, the color mode for the page 21 is set to "NULL".

The description "NULL" is set for the entire job and the color mode for the entire job is set to "monochromatic". Accordingly, the constraint rule is applied and it is determined that the setting of the RGB input profile for the page 21 cannot be performed. In a similar manner, it is determined that the RGB input profile cannot be set for the pages 22 through 30.

After step S1606 for the page 30 is completed, the variable "i"=31 in step S1607. In step S1608, the printer driver 805 ends the constraint determination processing.

In step S1609, the printer driver 805 consolidates the pages to which the RGB input profile can be set. According to the result of the above-described processing, the RGB input profile can be set to the pages 10 through 20. The processing in the flow chart of FIG. 16, namely, the processing in step S1502, thus ends.

Figure 19:
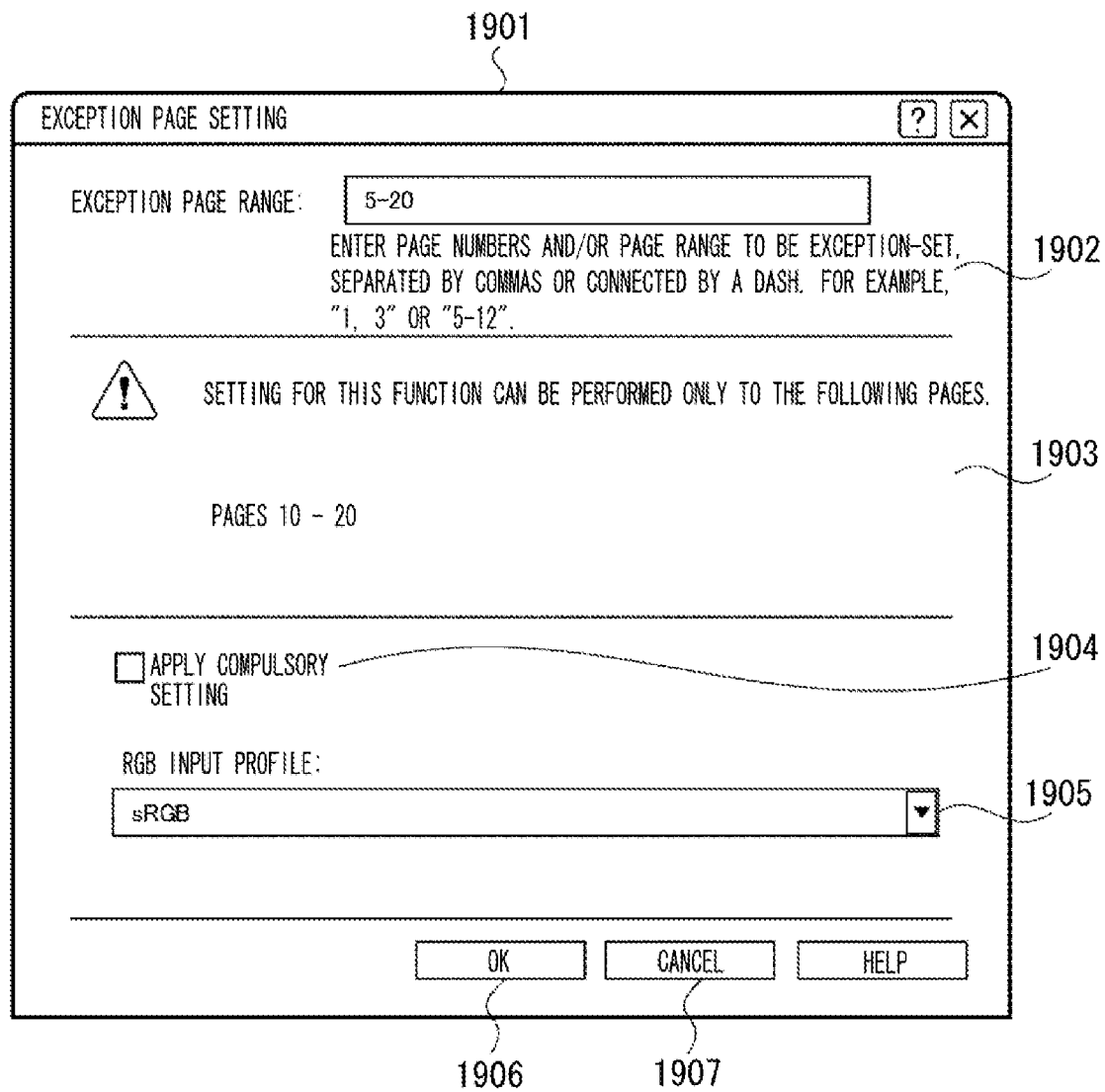
FIG. 19 illustrates an exception setting dialog box according to the first exemplary embodiment of the present invention.

In step S1503 (FIG. 15), the printer driver 805 displays an exception page setting dialog 1901 illustrated in FIG. 19. The exception page setting dialog 1901 includes a control 1902, information 1903, a compulsory setting check box 1904, and an RGB input profile control 1905. The control 1902 is used for inputting the page range on which exception setting is set. The information 1903 includes information about the page range computed in step S1502 on which the RGB input profile can be set.

Figure 18:
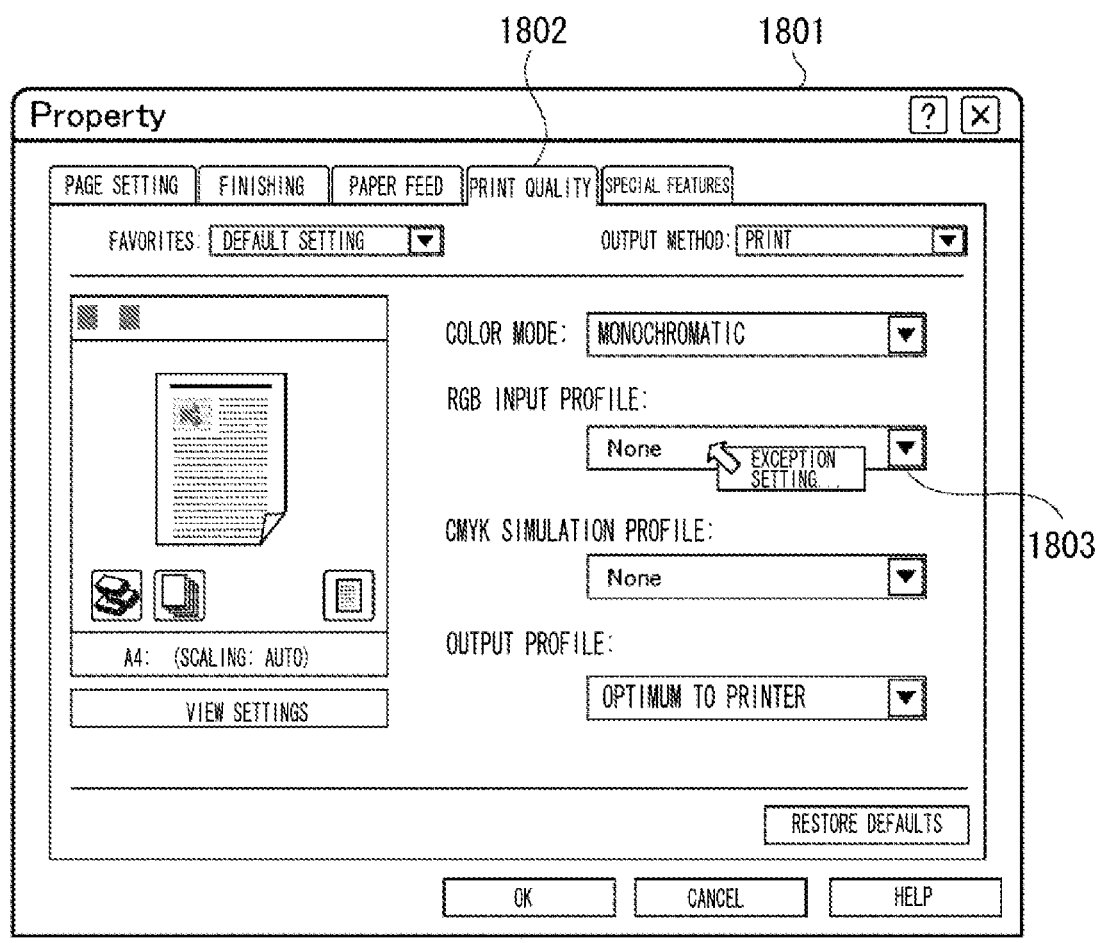
FIG. 18 illustrates a print quality sheet of the printer driver according to the first exemplary embodiment of the present invention.

The option for the RGB input profile displayed in step S1503 can include a value "same as job setting", which indicates that the same value as the value set for the entire job is set, in addition to the options for the RGB input profile 1803 used for performing a setting for the entire job illustrated in FIG. 18. This applies to the RGB input profile and also to the functions on which exception can be set.

In step S1504, the user performs desired setting via the exception page setting dialog 1901. the printer driver 805 inputs the setting value designated by the user.

It is supposed that the user has selected "5-20" for the exception page range 1902 and "sRGB" for the RGB input profile control 1905. The user needs to click an OK button 1906 to enter the user setting. In addition, in order to cancel the setting and close the exception page setting dialog 1901, the user clicks a cancel button 1907.

In step S1506, the printer driver 805 determines whether the OK button 1906 and the cancel button 1907 are pressed by the user. If it is determined in step S1506 that the OK button 1906 has been pressed by the user, then the printer driver 805 advances to step S1508. On the other hand, if it is determined in step S1506 that the cancel button 1907 has been pressed by the user, then the printer driver 805 ends the processing.

In step S1508, the printer driver 805 determines whether the setting for the compulsory setting button 1904 is set ON. If it is determined in step S1508 that the compulsory setting button 1904 is set OFF, then the printer driver 805 advances to step S1509.

In step S1509, the printer driver 805 compares the exception page range "5-20", which has been input by the user, with the page range "10-20" that can be set.

If it is determined in step S1510 that the set exception page range does not exceed the settable page range that can be set (Yes in step S1510), then the printer driver 805 advances to step S1507. On the other hand, if it is determined that the set exception page range exceeds the page range that can be set (No in step S1510), then the printer driver 805 shifts to step S1511. In the example in FIG. 15, the exception page range "5-20" input by the user exceeds the page range "10-20" that can be set. Accordingly, the printer driver 805 shifts to step S1511.

Figure 21:
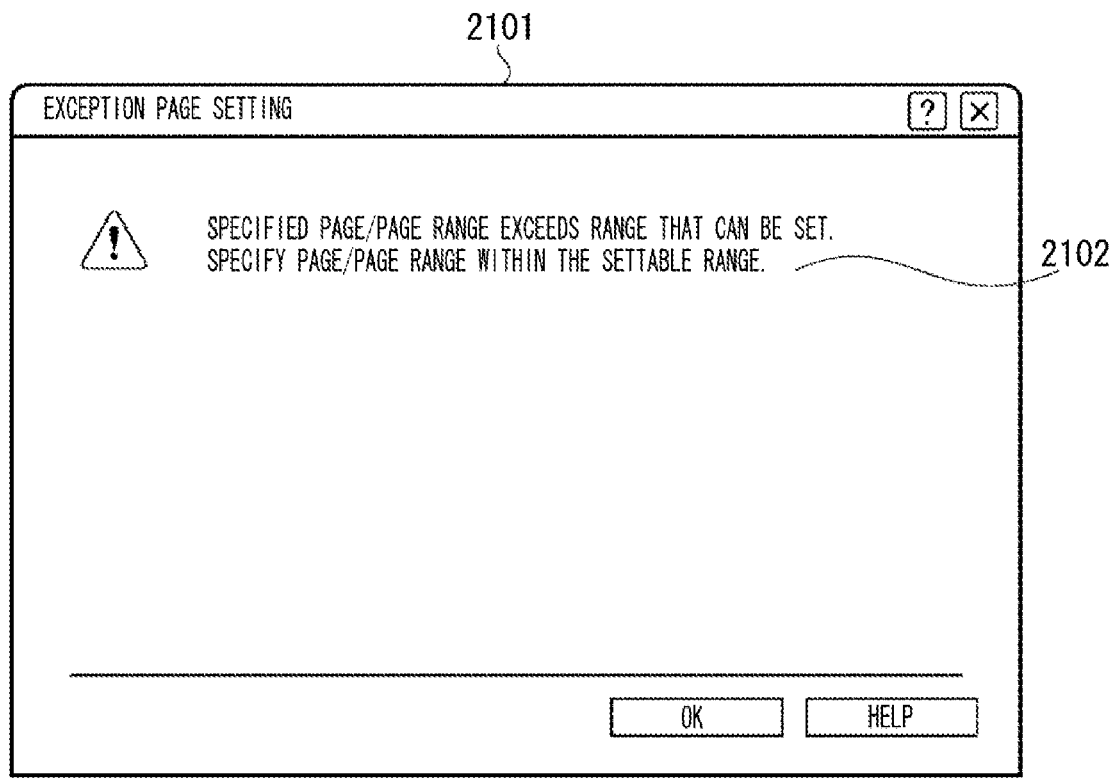
FIG. 21 illustrates an error message dialog box according to the first exemplary embodiment of the present invention.
Figure 22:
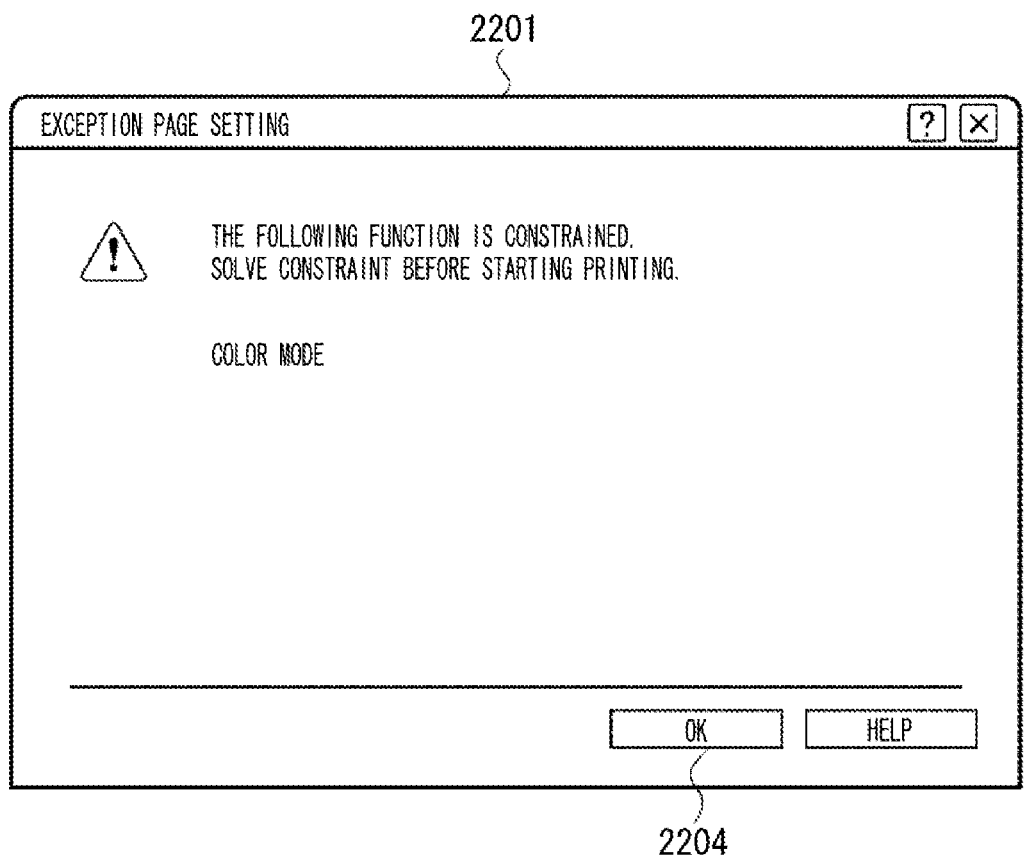
FIG. 22 illustrates an error message dialog box according to the first exemplary embodiment of the present invention.

In step S1511, the printer driver 805 displays a message dialog 2101, which indicates an error message 2102 illustrated in FIG. 21. In the message dialog 2101, the printer driver 805 displays the message 2102 indicating that the page range set by the user exceeds the page range that can be set, to urge the user to reset the page range.

Then, the printer driver 805 returns to step S1504. In step S1504, the user sets again the page range on which exception setting is performed. If the user enters the value "10-20" for the exception page range, the entered page range does not exceed the page range that can be set. Accordingly, the printer driver 805 advances to step S1507.

In step S1507, the printer driver 805 stores the setting values set via the exception page setting dialog 1901 in the printer deriver setting storage area 803 corresponding to the printer driver 805. In step S1515, the printer driver 805 writes the content of the print setting set as exception for the set page range into the exception page setting table 1701 so that the exception page setting table 1701 is updated.

FIG. 20 illustrates an example of an exception setting table 2001. The format of the exception setting table 2001 is similar to that illustrated in FIG. 17. Accordingly, the description thereof is not repeated here. By the above operation performed by the user, the RGB input profile for the pages 10 through 20 is set to "sRGB". Thus, in setting value cells 2009 through 2011 in an RGB input profile function column 2006, the setting value "sRGB" is stored.

In addition, by the above user operation, the exception setting of the RGB input profile for the pages 10 through 20 is completed.

Thus, the printer driver 805 can receive an instruction for performing the exception setting to one print setting item in the print setting screen. Furthermore, according to the instruction, the printer driver 805 can display the page range designation screen used for setting the page range to perform the exception setting for the print setting items.

Accordingly, the user can generate an instruction for exception setting independently and separately for each of the print setting items via the print setting screen of the user interface of the commonly used printer driver. Thus, the user's convenience can be improved.

Furthermore, when setting an exception page range with respect to a specific print setting item, the page range on which the exception setting can be performed is computed from the already set print setting values and is displayed. Accordingly, the user is prevented from setting by mistake the page range on which exception setting cannot be set.

Now, the processing for designating "perform compulsory setting" in the exception page setting dialog 1901 will be described below. It is now supposed that the user has opened the exception page setting dialog 1901 of the RGB input profile in order to perform the exception setting of the RGB input profile.

In this case, because the color mode is set to "color", the RGB input profile can be set for the pages 10 through 20 only when the exception page setting dialog 1901 is opened. If the user desires to set the color mode "color" and the RGB input profile for the pages 5 through 20, in a conventional method, the user has to cancel and close the exception setting dialog, set the color mode "color" for the pages 5 through 20 as the exception setting, and then open the exception setting dialog for the RGB input profile to perform exception setting.

In this method, many steps need to be taken during the operation because the user is required to change the setting and re-open the dialog. Thus, this method is inconvenient for the user. Since it is more effective to perform setting regardless of the constraint, the printer driver 805 according to the present exemplary embodiment includes the "perform compulsory setting" check box 1904 in the exception page setting dialog 1901.

When the check box 1904 is set ON, even when the exception page range set by the user exceeds the page range that can be set, the printer driver 805 temporarily stores the content set via the exception page setting dialog 1901. This operation will be described below with reference to the flow chart of FIG. 15.

It is supposed that the user enters the value "5-20" in the exception page range control 1902. Then, if the user desires to perform the setting although the set page range exceeds the page range that can be set, the user sets the "perform compulsory setting" check box 1904 to ON.

Now, the operation of the printer driver according to the steps in the flow chart illustrated in FIG. 15 will be described below. The steps similar to those described above will be omitted in the following description and only the operation different from the above description will be described below.

In step S1508, the printer driver 805 determines whether the "perform compulsory setting" check box 1904 is set ON. If it is determined in step S1508 that the "perform compulsory setting" check box 1904 is set ON, then the printer driver 805 advances to step S1512.

In step S1512, the printer driver 805 makes a list of functions which can be constrained according to the constraint rule file illustrated in FIG. 12. In step S1513, the printer driver 805 determines whether there exists any function to be constrained.

In the supposed state, the setting of the RGB input profile is constrained against the setting of the monochromatic printing in the color mode setting item. Accordingly, the printer driver 805 advances to step S1514. In step S1514, in order to notify the user of the constraint, the printer driver 805 displays a message dialog 2201 illustrated in FIG. 22.

In the message dialog 2201, a print setting item (print function) that is constrained (conflicting with the setting for the color mode) due to the setting of the exception setting, is displayed. The user, after confirming the message displayed in the message dialog 2201, presses an OK button 2204. Then, the message dialog 2201 disappears.

In step S1507, the printer driver 805 stores the content of the setting performed via the exception page setting dialog 1901 into the printer deriver setting storage area 803. In step S1515, the printer driver 805 updates an exception page setting table. FIG. 23 illustrates an exception setting table 23 after the updating. In the exception page setting table 2301, "sRGB" is set for the RGB input profile for the pages 5 through 20.

<Flow of Printing According to the Present Exemplary Embodiment>

Figure 24:
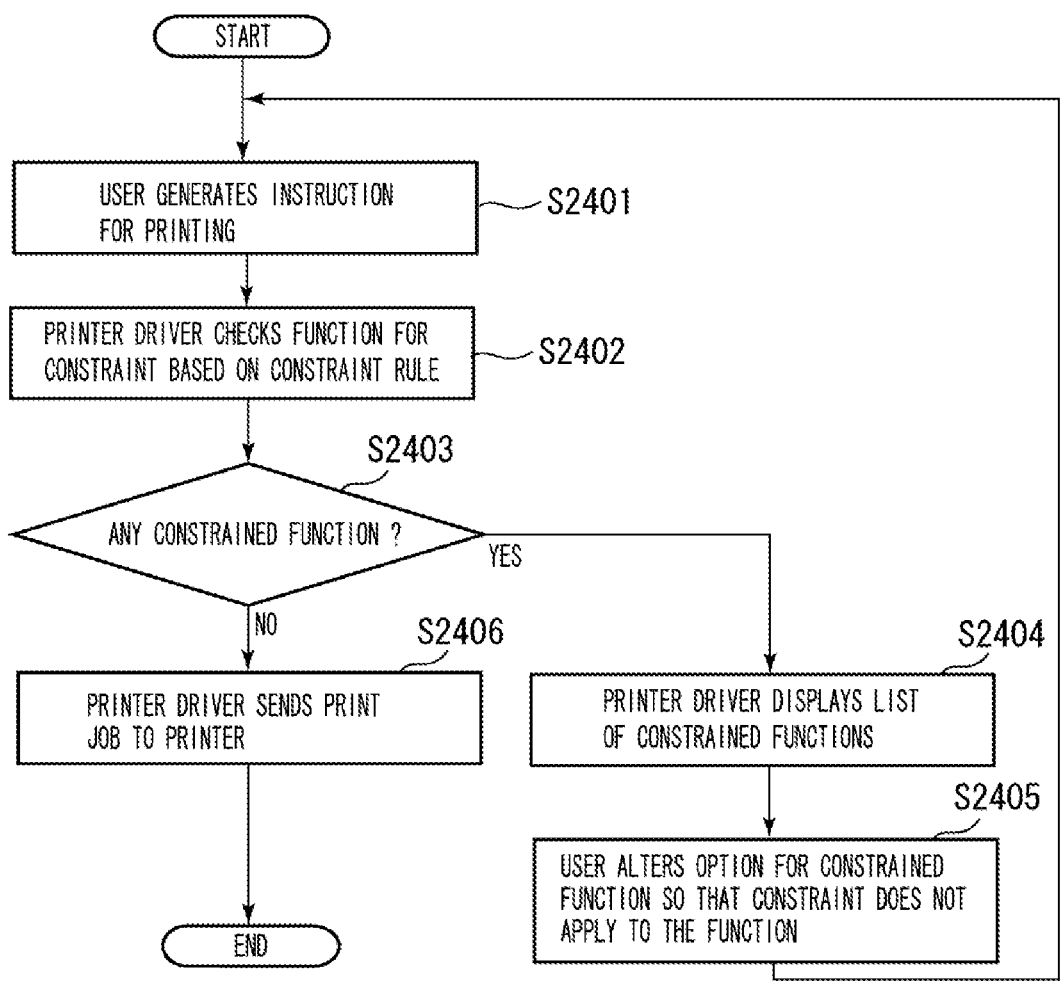
FIG. 24 is a flow chart illustrating processing for controlling generation of a print job according to the first exemplary embodiment of the present invention.

Now, the processing for controlling the print in response to a print instruction according to the present exemplary embodiment will be described below. FIG. 24 is a flow chart illustrating the control related to the print processing by the printer driver performed when the user issues a print instruction.

In step S2401, the user selects a print menu of the application to display the print property dialog illustrated in FIG. 2, and then presses the OK key 205 in FIG. 2 to issue the print instruction. Thus, the printer driver 805 is activated via the OS 802 and receives the print start instruction from the application.

In step S2402, the printer driver 805, according to the constraint rule, applies the constraint rule based on the setting value for the entire job (also referred to as the "basic print setting") and the setting value in the exception page setting table 2301 to check whether constraint has occurred. In step S2403, the printer driver 805, based on the result of the checking, determines whether any constraint has occurred.

In the supposed state in the present exemplary embodiment, in the exception page setting table 2301, constraint occurs between the setting of the RGB input profile and the setting of the color mode as the constraint related to the page range that can be set. When it is determined in step S2403 that constraint has occurred (Yes in step S2403), then the printer driver 805 shifts to step S2404.

Figure 25:
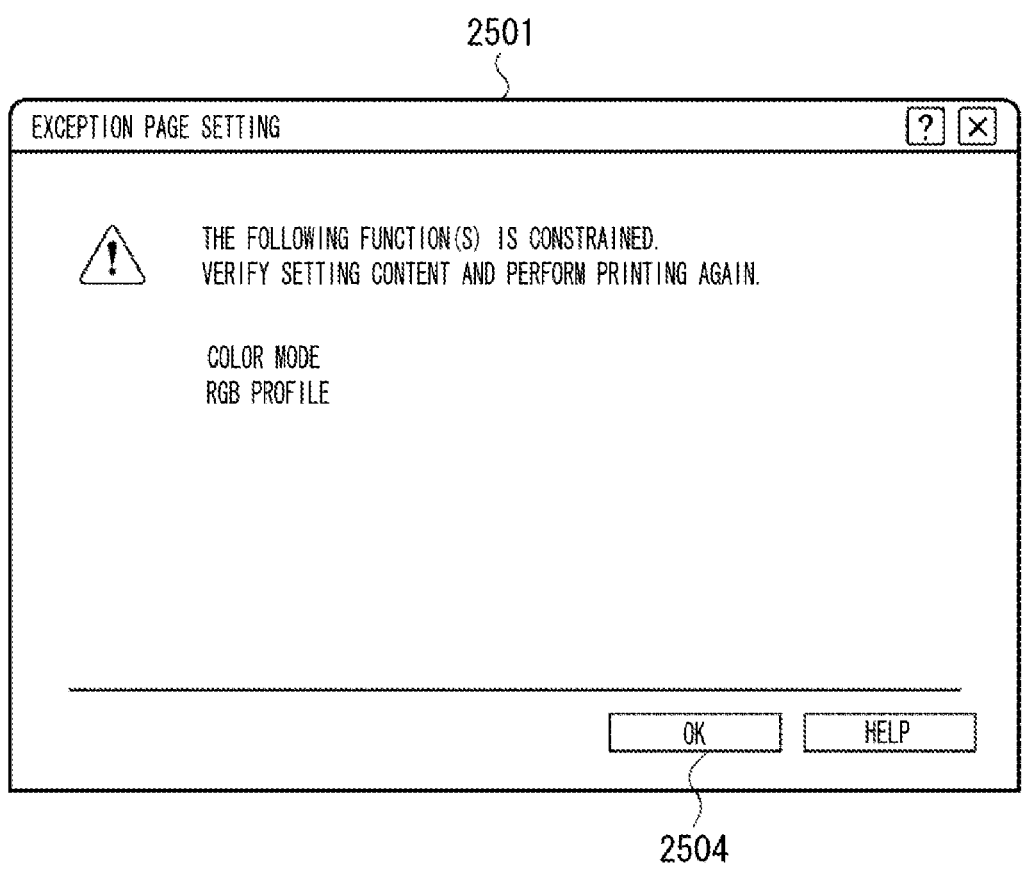
FIG. 25 illustrates an error message dialog box according to the first exemplary embodiment of the present invention.

In step S2404, the printer driver 805 displays a list of the constrained functions and an error message. FIG. 25 illustrates an example of the error message. By displaying a message dialog 2501, the printer driver 805 urges the user to reset the printing condition.

When the user presses an OK key 2504 in FIG. 25, the printer driver 805 suspends the print processing. In step S2405, the printer driver 805 displays a print setting dialog screen using the user I/F driver 806. Thus, the user can perform the setting for the printer driver again so that the constraint can be solved.

On the other hand, if it is determined that no constraint has occurred (No in step S2403), then the printer driver 805 performs the processing for generating a print job, as described above. With the above-described processing, the exception page setting for the print job can be performed.

Second Exemplary Embodiment

Now, a second exemplary embodiment of the present invention will be described below. The print system and the preconditions applied in the second exemplary embodiment are similar to those in the first embodiment. Accordingly, the description will be made below only with respect to portions different from the first exemplary embodiment and the description of the similar portions will be omitted in the following.

Figure 26:
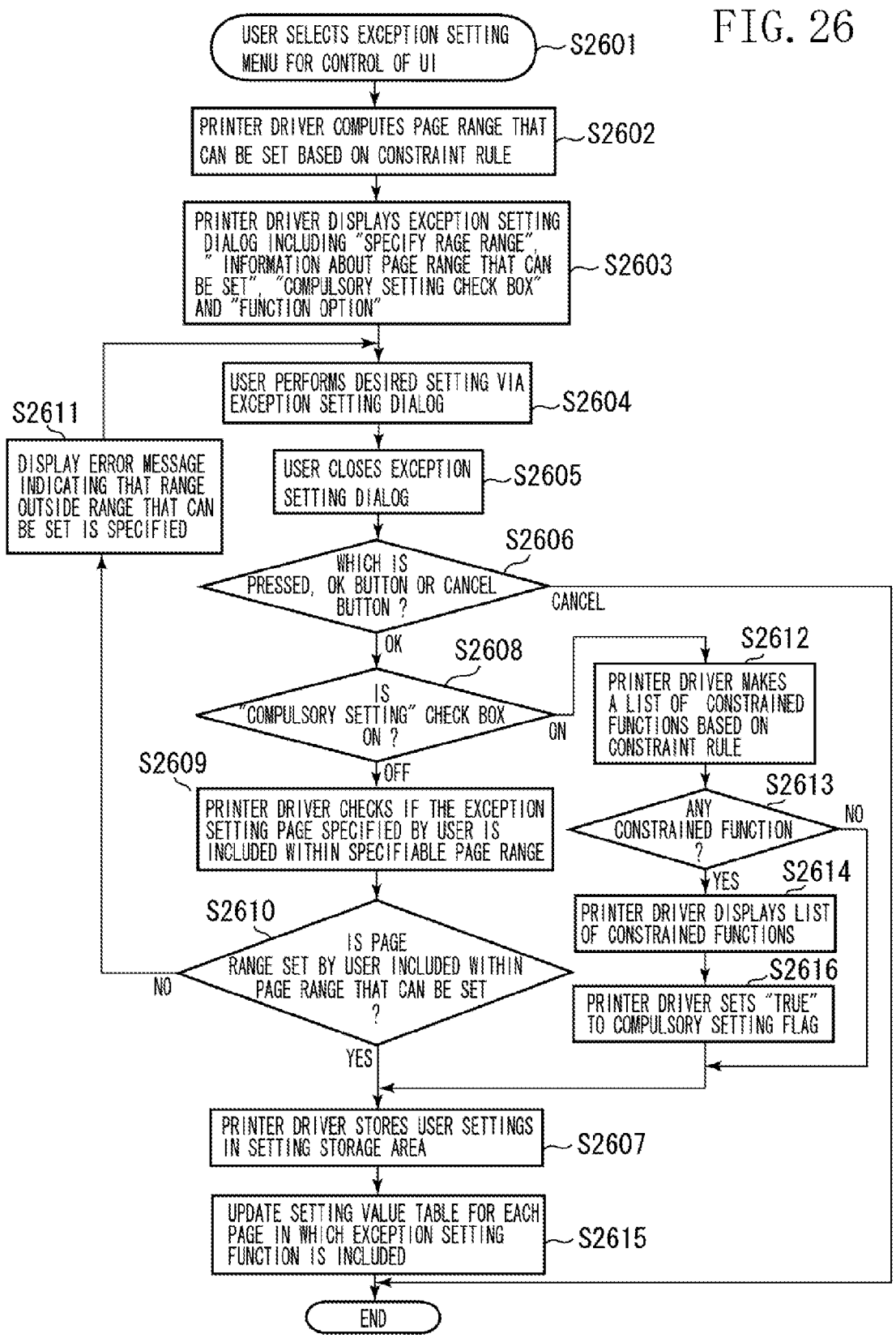
FIG. 26 is a flow chart illustrating processing for controlling exception setting according to a second exemplary embodiment of the present invention.
Figure 28:
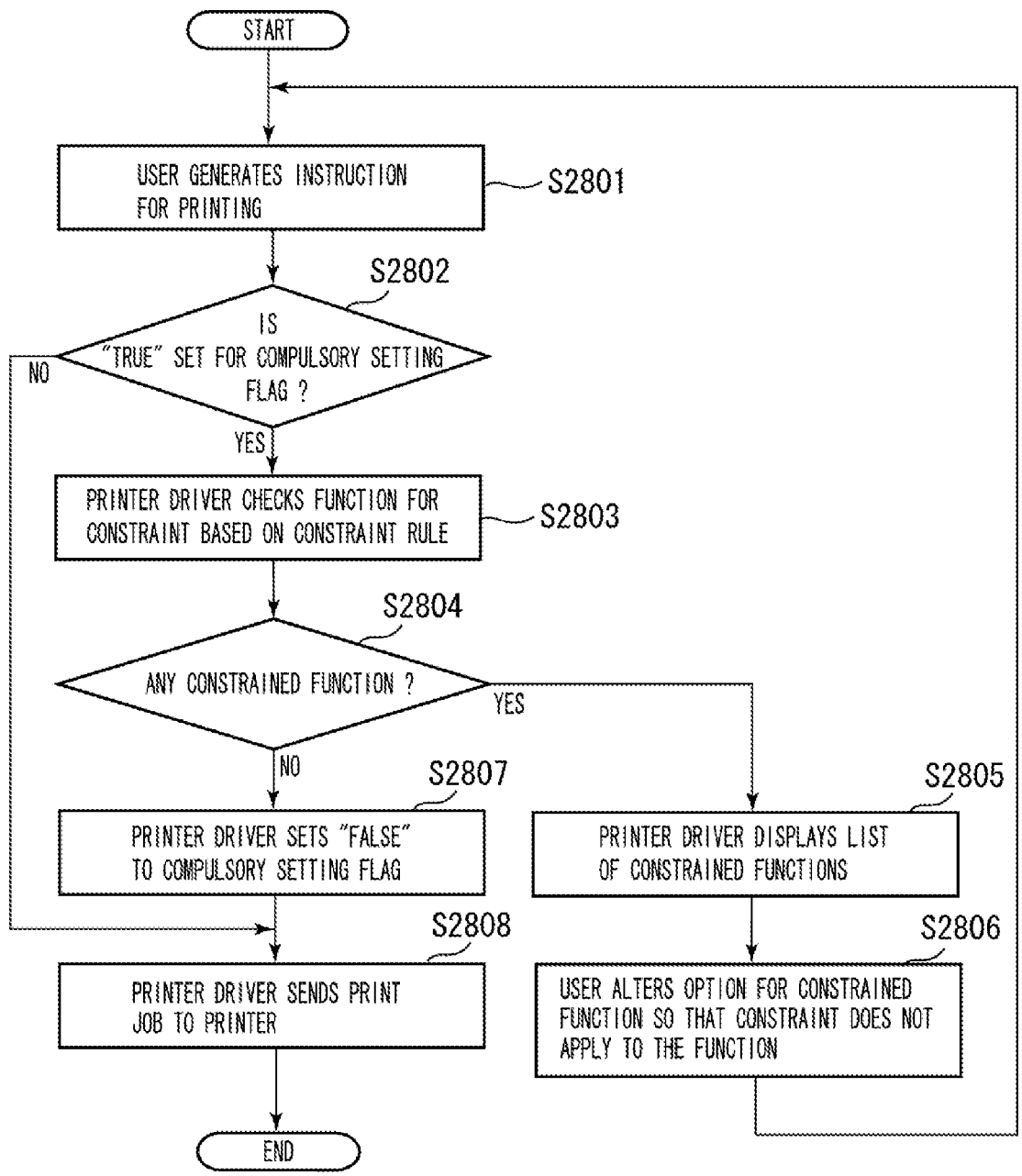
FIG. 28 is a flow chart illustrating processing for controlling generation of a print job according to the second exemplary embodiment of the present invention.

FIGS. 26 through 28 illustrate the second exemplary embodiment. FIG. 26 is a flow chart illustrating the operation according to the second exemplary embodiment. The flow chart in FIG. 26 is different from the flow chart of FIG. 15 only in that the processing in step S2616 is added. Accordingly, the processing performed in steps S2501 through 2515 will not be described here.

In the case where the user has set the "perform compulsory setting" check box 1904 (FIG. 19) to ON, the printer driver 805 shifts to step S2612. In step S2616 in the processing after step S2612, the printer driver sets a compulsory setting flag to "True".

The compulsory setting flag is a storage table existing in a setting storage area of the printer driver. FIG. 27 illustrates a setting table 2701. The printer driver 805 stores the value "True" in the setting table 2701.

If the user sets the "perform compulsory setting" check box 1904 to OFF, the compulsory setting flag remains to be a default value, namely, the value "False".

FIG. 28 is a flow chart illustrating an operation from the issuance of the print instruction by the user to the printing of the print job.

In step S2801, the user selects the print menu of the application to display a print property dialog (FIG. 2), and presses the OK key 205 in FIG. 2 to issue an instruction for printing.

Thus, the printer driver 805 is activated via the OS 802 and receives the print start instruction from the application.

In step S2802, the printer driver 805 acquires the compulsory setting flag stored in the printer deriver setting storage area 803. If the compulsory setting flag is set to "False", no constraint has occurred. Accordingly, the printer driver 805 shifts to step S2808. In step S2808, the printer driver 805 sends the print job to the printer 809.

On the other hand, if the compulsory flag is set ON, that is, if it is likely that the user has performed the exception setting regardless of the constraint, then the printer driver 805 shifts to step S2803. In step S2803, the printer driver 805, according to the constraint rule, checks whether any constraint has occurred by applying the constraint rule, based on the setting value for the entire job and the setting value in the exception page setting table 2301.

Because the user has performed the setting regardless of the constraint (i.e., the page range that can be set) in the exception page setting table 2301, constraint has occurred between the setting of the RGB input profile and the setting for the color mode. If it is determined that the constraint have occurred, the printer driver 805 shifts from step S2804 to step S2805. In step S2805, the printer driver displays a list of the constrained functions and an error message.

In step S2806, the user resets the printer driver 805 so that the constraint can be cancelled. Then, the printer driver 805 returns to step S2801. In step S2801, the user issues a print instruction. According to the setting performed this time, no constraint occurs. Then, in step S2804, it is determined that no constraint has occurred. Then, the printer driver 805 advances to step S2807.

In step S2807, because all the constraints have been already cancelled, the printer driver 805 sets the compulsory setting flag to "False". In step S2808, the printer driver 805 performs printing.

In the above-described processing, the exception page setting of the print job can be performed.

Third Exemplary Embodiment

Now, a third exemplary embodiment of the present invention will be described below. The print system and the preconditions applied in the third exemplary embodiment are similar to those in the first embodiment. Accordingly, the description will be made below only with respect to portions different from the first exemplary embodiment and the description of the similar portions will be omitted in the following.

Figure 29:
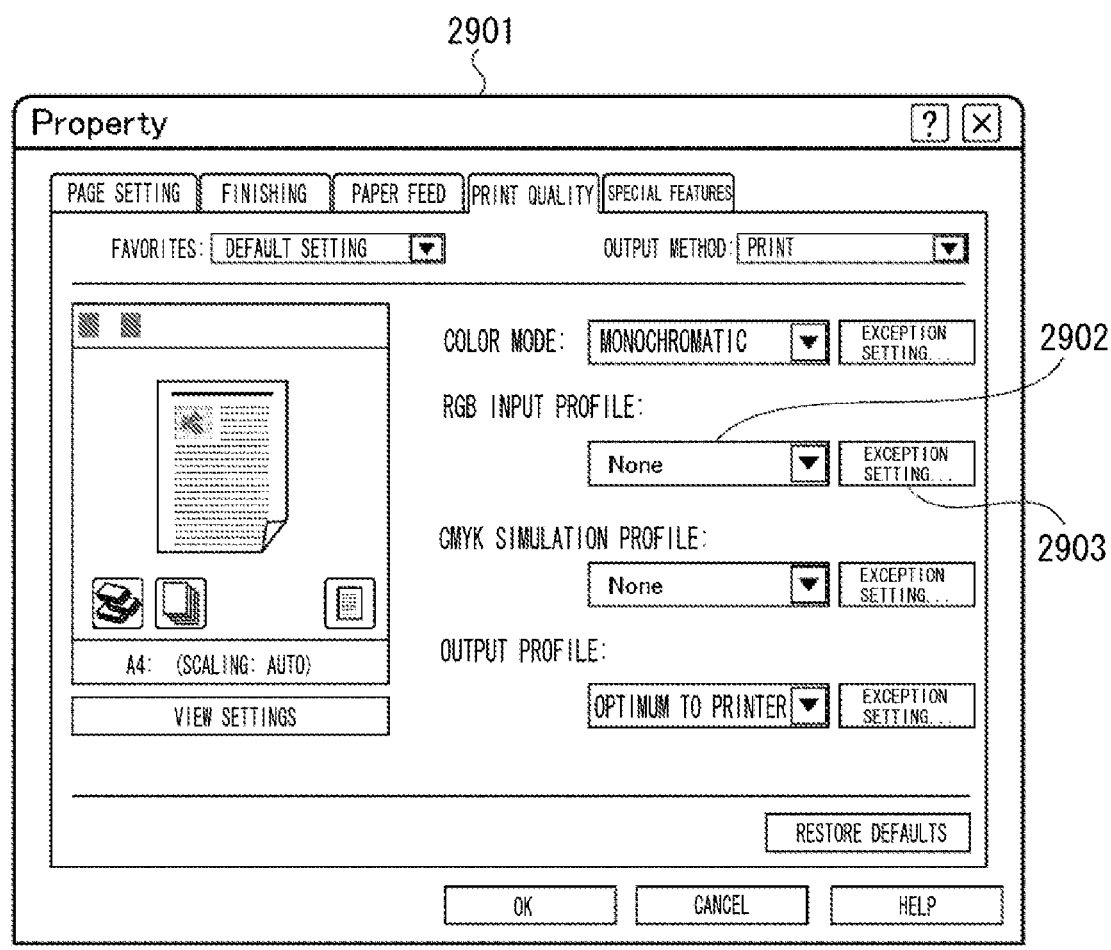
FIG. 29 illustrates a print quality sheet of a printer driver according to a third exemplary embodiment of the present invention.

FIG. 29 illustrates a user interface 2901 used in performing exception setting for each function. An RGB input profile 2902, which is similar to the RGB input profile described above, for example, can be set for exception page. In the third exemplary embodiment, with respect to the control that can be set as exception, an "exception setting" button 2903 is added next to the control that enables exception setting. When the user presses the "exception setting" button 2903, the printer driver 805 displays the exception page setting dialog 1901 in FIG. 19.

The operation of displaying the exception page setting dialog 1901 and the operation performed thereafter to print the print job are similar to the first and the second exemplary embodiments. Accordingly, the description thereof is omitted here.

As described above, according to the present exemplary embodiment, the user can perform the desired exception setting to the control of the function which the user wishes to set as exception page, without changing an appearance of a user interface (UI) screen of the commonly used printer driver. Accordingly, the user can easily understand the operation, and the user can perform the exception page setting by a simple operation.

Furthermore, because the appearance of the UI screen of the commonly used printer driver is not changed, even a user who is not accustomed to performing exception page setting can easily perform the operation.

In addition, because the constraint conditions are displayed, the setting in which no constraint occurs can be easily performed.

According to the exemplary embodiments of the present invention, a method can be provided which allows the user to perform exception page setting for each print setting item on the print setting screen that is used to perform a common print setting for the print job.

Therefore, the user (operator) can perform exception page setting for the print job by a simple operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-173630 filed Jun. 23, 2006, which is hereby incorporated by reference herein in its entirety.

What is claimed is:

1. An apparatus configured to set a print setting of a print job to be printed, the apparatus comprising:
    a first display unit configured to display a print setting screen for designating a setting value for each of a plurality of print setting items;
    a first setting unit configured to set the setting value for each of the plurality of print setting items as a basic print setting for the print job according to an instruction of operation entered via the print setting screen;
    a first receiving unit configured to receive an instruction of an exception setting to be set to one print setting item of the plurality of print setting items displayed on the print setting screen to set the basic print setting;
    a second display unit configured to, when the instruction is received by said first receiving unit, display a first exception page setting screen for the one print setting item for designating a setting value for the exception setting different from a setting value for the basic print setting for the print job;
    a second receiving unit configured to receive an instruction of exception settings to be set to a plurality of print setting items displayed on the print setting screen to set the basic print setting;
    a third display unit configured to, when the instruction is received by said second receiving unit, display a second exception page setting screen for the plurality of printing setting items for designating setting values for the exception settings, each of the setting values being different from a setting value for the basic print setting; and
    a generating unit configured to generate the print job according to the basic print setting and the exception setting.

2. The apparatus according to claim 1, wherein the first exception page setting screen includes a first user operable field for designating a range of pages on which the exception setting is applied, and a second user operable field for designating a setting value for the exception setting.

3. The apparatus according to claim 1, further comprising:
a first determination unit configured to determine whether a setting value, which is to be excluded by the setting value for the exception setting entered via the first exception page setting screen and is to be constrained, is set for the basic print setting; and
a warning display unit configured, if the first determination unit determines that a setting value that is to be constrained, is set for the setting value for the exception setting with respect to the basic print setting, to display a message screen indicating that the setting value for the exception setting entered via the exception page setting screen conflicts with a constraint rule.

4. The apparatus according to claim 1, further comprising:
a second determination unit configured to determine whether a setting value, which is to be excluded by the setting value for the exception setting entered via the first exception page setting screen, is set for the basic print setting; and
a warning display unit configured, in a case where the second determination unit determines that a setting value that is to be excluded by the setting value for the exception setting, is set for the basic print setting, to display a message screen indicating the print setting item of the basic print setting to be excluded, by setting the setting value for the exception setting entered via the first exception page setting screen.

5. The apparatus according to claim 1,
wherein the print setting screen includes a plurality of print setting sheets, and
wherein the plurality of print setting sheets includes an exception setting sheet for designating each setting value of a plurality of print setting items as the exception setting different from the basic print setting for the print job.

6. A program stored on a non-transitory computer-readable medium, including instructions which, when executed by an apparatus, causes the apparatus to perform operations comprising:
displaying a print setting screen for designating a setting value for each of a plurality of print setting items;
setting the setting value of each of the plurality of print setting items as a basic print setting for the print job according to an instruction of operation entered via the print setting screen;
receiving, by a first receiving unit, an instruction of an exception setting to be set to one print setting item of the plurality of print setting items displayed on the print setting screen to set the basic print setting;
displaying, when the instruction is received by the first receiving unit, a first exception page setting screen for the one print setting item for designating a setting value for the exception setting different from a setting value for the basic print setting for the print job;
receiving, by a second receiving unit, an instruction of exception settings to be set to a plurality of print setting items displayed on the print setting screen to set the basic print setting;
displaying, by a third display unit configured to, when the instruction is received by said second receiving unit, a second exception page setting screen for the plurality of printing setting items for designating setting values for the exception settings, each of the setting values being different from a setting value for the basic print setting; and
generating the print job according to the basic print setting and the exception setting.

7. The program according to claim 6, wherein the first exception page setting screen includes a first user operable field for designating a range of pages on which the exception setting is applied, and a second user operable field for designating a setting value for the exception setting, and
wherein the setting value for the exception setting is associated with the page range designated in the first user operable field.

8. The program according to claim 6, wherein the operations further comprise:
determining whether a setting value, which is excluded by the setting value for the exception setting entered via the first exception page setting screen and is to be constrained, is set for the basic print setting; and
if it is determined that a setting value that is to be constrained is set for the setting value for the exception setting with respect to the basic print setting, displaying a message screen indicating that the setting value for the exception setting entered via the exception page setting screen conflicts with a constraint rule.

9. The program according to claim 6, wherein the operations further comprise:
determining whether a setting value, which is to be excluded by the setting value for the exception setting entered via the first exception page setting screen, is set for the basic print setting; and
if it is determined that a setting value that is to be excluded by the setting value for the exception setting, is set for the basic print setting, displaying a message screen indicating the print setting item of the basic print setting to be excluded, by setting the setting value for the exception setting entered via the first exception page setting screen.

10. The program according to claim 6, wherein the print setting screen includes a plurality of print setting sheets, and wherein the plurality of print setting sheets includes an exception setting sheet for designating each setting value of a plurality of print setting items as the exception setting different from the basic print setting for the print job.

11. A method comprising:
displaying a first setting screen for designating a setting value for each of a plurality of print setting items;
storing the setting value of each of the plurality of setting items as a first print setting for a print job according to an instruction of operation entered via the first setting screen;
receiving, by a first receiving unit, an instruction of an exception setting to be set to one print setting item of the plurality of print setting items displayed on the first setting screen to set the basic print setting;
displaying, when the instruction is received by the first receiving unit, a second setting screen for the one print setting item for designating a setting value for the print job;
receiving, by a second receiving unit, an instruction of exception settings to be set to a plurality of print setting items displayed on the print setting screen to set the basic print setting;
displaying, by a third display unit configured to, when the instruction is received by said second receiving unit, a second exception page setting screen for the plurality of printing setting items for designating setting values for the exception settings, each of the setting values being different from a setting value for the basic print setting; and
generating the print job according to the first print setting and the second print setting.

12. The method according to claim 11, wherein the second setting screen includes a first user operable field for designating a range of pages on which the second print setting is applied, and a second user operable field for designating a setting value for the second print setting.

13. The method according to claim 12, further comprising:
associating the setting value for the second print setting with the page range designated in the first user operable field.

14. An apparatus configured to set a print setting of a print job to be printed, the apparatus comprising:
a first display unit configured to display a print setting screen for designating a setting value for a basic print setting for each of a plurality of print setting items; and
a display control unit configured to, when a first instruction is entered for the print setting screen displayed by said first display unit, display a first exception page setting screen on one print setting item for designating a setting value for exception setting different from a setting value for the basic print setting for the one print setting item, and when a second instruction is entered for the print setting screen displayed by said first display unit, display a second exception page setting screen on a plurality of print setting items for designating the setting value for the exception setting for the plurality of setting items.

15. A method for setting a print setting of a print job to be printed, the method comprising:
displaying a print setting screen, by a first display unit, for designating a setting value for a basic print setting for each of a plurality of print setting items; and
displaying a first exception page setting screen on one print setting item, by a display control unit, when a first instruction is entered for the print setting screen displayed by said first display unit, for designating a setting value for exception setting different from a setting value for the basic print setting for the one print setting item, and when a second instruction is entered for the print setting screen displayed by said first display unit, display a second exception page setting screen on a plurality of print setting items for designating the setting value for the exception setting for the plurality of setting items.

16. A program stored on a non-transitory computer-readable medium, including instructions which, when executed by an apparatus, causes the apparatus to perform operations for setting a print setting of a print job to be printed comprising:
displaying a print setting screen, by a first display unit, for designating a setting value for a basic print setting for each of a plurality of print setting items; and
displaying a first exception page setting screen on one print setting item, by a display control unit, when a first instruction is entered for the print setting screen displayed by said first display unit, for designating a setting value for exception setting different from a setting value for the basic print setting for the one print setting item, and when a second instruction is entered for the print setting screen displayed by said first display unit, display a second exception page setting screen on a plurality of print setting items for designating the setting value for the exception setting for the plurality of setting items.

* * * * *